United States Patent
Prikhodko et al.

(10) Patent No.: US 11,686,581 B2
(45) Date of Patent: Jun. 27, 2023

(54) STRESS-RELIEF MEMS GYROSCOPE

(71) Applicant: Analog Devices, Inc., Wilmington, MA (US)

(72) Inventors: Igor P. Prikhodko, Buzzards Bay, MA (US); Gaurav Vohra, Sudbury, MA (US)

(73) Assignee: Analog Devices, Inc., Wilmington, MA (US)

( * ) Notice: Subject to any disclaimer, the term of this patent is extended or adjusted under 35 U.S.C. 154(b) by 78 days.

(21) Appl. No.: 17/340,859

(22) Filed: Jun. 7, 2021

(65) Prior Publication Data

US 2021/0381832 A1 Dec. 9, 2021

Related U.S. Application Data

(60) Provisional application No. 63/069,656, filed on Aug. 24, 2020, provisional application No. 63/036,273, filed on Jun. 8, 2020.

(51) Int. Cl.
*G01C 19/5712* (2012.01)

(52) U.S. Cl.
CPC ................. *G01C 19/5712* (2013.01)

(58) Field of Classification Search
CPC .................................................. G01C 19/5712
See application file for complete search history.

(56) References Cited

U.S. PATENT DOCUMENTS

| | | | |
|---|---|---|---|
| 5,016,072 A | 5/1991 | Greiff | |
| 5,241,861 A | 9/1993 | Hulsing, II | |
| 5,392,650 A | 2/1995 | O'Brien et al. | |
| 5,490,420 A | 2/1996 | Burdess | |

(Continued)

FOREIGN PATENT DOCUMENTS

| | | | |
|---|---|---|---|
| CN | 104272062 A | 1/2015 | |
| CN | 102597699 B | 7/2015 | |

(Continued)

OTHER PUBLICATIONS

International Search Report and Written Opinion for International Application No. PCT/US2021/036190, dated Sep. 10, 2021.

(Continued)

*Primary Examiner* — David J Bolduc
(74) *Attorney, Agent, or Firm* — Wolf, Greenfield & Sacks, P.C.

(57) ABSTRACT

A MEMS device is provided comprising a substrate; a proof mass coupled to the substrate and configured to move along a resonator axis; a drive structure comprising at least one electrode and configured to drive the proof mass to move along the resonator axis; and a pivoting linkage coupled to the proof mass at first and second ends of the pivoting linkage, the first end comprising a first fixed pivot and the second end comprising a second fixed pivot, the pivoting linkage comprising: a first bar configured to pivot about the first fixed pivot and a first dynamic pivot; a second bar configured to pivot about the second fixed pivot and a second dynamic pivot; and a third bar configured to pivot about the first dynamic pivot and the second dynamic pivot, wherein the proof mass moves along the resonator axis when the pivoting linkage pivots.

20 Claims, 23 Drawing Sheets

(56) References Cited

U.S. PATENT DOCUMENTS

| | | | |
|---|---|---|---|
| 5,600,064 A | 2/1997 | Ward | |
| 5,635,638 A | 6/1997 | Geen | |
| 5,869,760 A | 2/1999 | Geen | |
| 5,948,981 A * | 9/1999 | Woodruff | G01P 15/0802 |
| | | | 73/514.29 |
| 6,230,563 B1 | 5/2001 | Clark et al. | |
| 6,257,059 B1 | 7/2001 | Weinberg et al. | |
| 6,296,779 B1 | 10/2001 | Clark et al. | |
| 6,370,937 B2 | 4/2002 | Hsu | |
| 6,481,285 B1 | 11/2002 | Shkel et al. | |
| 6,505,511 B1 | 1/2003 | Geen et al. | |
| 6,513,380 B2 | 2/2003 | Reeds, III et al. | |
| 6,571,630 B1 | 6/2003 | Weinberg et al. | |
| 6,634,231 B2 | 10/2003 | Malametz | |
| 6,705,164 B2 | 3/2004 | Willig et al. | |
| 6,752,017 B2 | 6/2004 | Willig et al. | |
| 6,843,126 B2 | 1/2005 | Hulsing, II | |
| 6,843,127 B1 | 1/2005 | Chiou | |
| 6,845,668 B2 | 1/2005 | Kim et al. | |
| 6,860,151 B2 | 3/2005 | Platt et al. | |
| 6,877,374 B2 | 4/2005 | Geen | |
| 6,883,361 B2 | 4/2005 | Wyse | |
| 7,032,451 B2 | 4/2006 | Geen | |
| 7,036,373 B2 | 5/2006 | Johnson et al. | |
| 7,204,144 B2 | 4/2007 | Geen | |
| 7,222,533 B2 | 5/2007 | Mao et al. | |
| 7,227,432 B2 | 6/2007 | Lutz et al. | |
| 7,258,011 B2 | 8/2007 | Nasiri et al. | |
| 7,268,463 B2 | 9/2007 | Li et al. | |
| 7,284,429 B2 | 10/2007 | Chaumet et al. | |
| 7,287,428 B2 | 10/2007 | Green | |
| 7,313,958 B2 | 1/2008 | Willig et al. | |
| 7,347,094 B2 | 3/2008 | Geen et al. | |
| 7,421,897 B2 | 9/2008 | Geen et al. | |
| 7,675,217 B2 | 3/2010 | Delevoye et al. | |
| 8,011,245 B2 | 9/2011 | Yatzenko et al. | |
| 8,061,201 B2 | 11/2011 | Ayazi et al. | |
| 8,096,181 B2 | 1/2012 | Fukumoto | |
| 8,205,498 B2 | 6/2012 | Hsu et al. | |
| 8,222,974 B2 | 7/2012 | Lutz et al. | |
| 8,266,961 B2 | 9/2012 | Kuang et al. | |
| 8,322,213 B2 | 12/2012 | Trusov et al. | |
| 8,342,023 B2 | 1/2013 | Geiger | |
| 8,354,900 B2 | 1/2013 | Cazzaniga et al. | |
| 8,443,667 B2 | 5/2013 | Trusov et al. | |
| 8,453,504 B1 | 6/2013 | Mao | |
| 8,490,483 B2 | 7/2013 | Wrede et al. | |
| 8,497,619 B2 | 7/2013 | Medhat et al. | |
| 8,516,886 B2 | 8/2013 | Acar et al. | |
| 8,516,889 B2 | 8/2013 | Simoni et al. | |
| 8,539,832 B2 | 9/2013 | Potasek et al. | |
| 8,549,919 B2 * | 10/2013 | Gunthner | G01C 19/574 |
| | | | 73/504.14 |
| 8,656,776 B2 | 2/2014 | Trusov et al. | |
| 8,783,105 B2 | 7/2014 | Kuhlmann et al. | |
| 8,794,067 B2 | 8/2014 | Schmid et al. | |
| 8,844,357 B2 | 9/2014 | Scheben et al. | |
| 8,991,247 B2 | 3/2015 | Trusov et al. | |
| 9,021,880 B2 | 5/2015 | Stephanou et al. | |
| 9,170,107 B2 | 10/2015 | Anac et al. | |
| 9,207,081 B2 | 12/2015 | Geen | |
| 9,207,254 B2 | 12/2015 | Simoni et al. | |
| 9,212,908 B2 | 12/2015 | Geen et al. | |
| 9,217,756 B2 | 12/2015 | Simon et al. | |
| 9,246,017 B2 | 1/2016 | van der Heide et al. | |
| 9,360,319 B2 | 6/2016 | Jia | |
| 9,493,340 B2 | 11/2016 | Mahameed et al. | |
| 9,599,471 B2 | 3/2017 | Vohra et al. | |
| 9,709,595 B2 | 7/2017 | Vohra et al. | |
| 9,878,901 B2 | 1/2018 | Geen et al. | |
| 10,167,189 B2 | 1/2019 | Zhang et al. | |
| 10,168,194 B2 | 1/2019 | Vohra et al. | |
| 10,203,352 B2 | 2/2019 | Zhang et al. | |
| 10,209,070 B2 | 2/2019 | Geisberger | |
| 10,239,746 B2 | 3/2019 | Kuang et al. | |
| 10,247,554 B2 | 4/2019 | Senkal et al. | |
| 10,317,210 B2 | 6/2019 | Kub et al. | |
| 10,330,471 B2 | 6/2019 | Zhang | |
| 10,415,968 B2 | 9/2019 | Prikhodko et al. | |
| 10,451,454 B2 | 10/2019 | Vohra et al. | |
| 10,514,259 B2 | 12/2019 | Jia et al. | |
| 10,585,111 B2 | 3/2020 | Zhang et al. | |
| 10,611,628 B2 | 4/2020 | Lee et al. | |
| 10,627,235 B2 | 4/2020 | Prikhodko et al. | |
| 10,655,963 B2 | 5/2020 | Ruohio et al. | |
| 10,697,774 B2 | 6/2020 | Prikhodko et al. | |
| 10,704,908 B1 | 7/2020 | Coronato et al. | |
| 10,732,198 B2 | 8/2020 | Zhang | |
| 10,746,548 B2 | 8/2020 | Gregory et al. | |
| 10,759,659 B2 | 9/2020 | Zhang et al. | |
| 10,816,569 B2 | 10/2020 | Zhang et al. | |
| 10,882,735 B2 | 1/2021 | Kuang et al. | |
| 11,460,301 B2 * | 10/2022 | Geisberger | G01C 19/5747 |
| 2001/0042405 A1 | 11/2001 | Hulsing | |
| 2002/0022291 A1 | 2/2002 | Ferrari et al. | |
| 2002/0170355 A1 * | 11/2002 | Malametz | B81B 3/0072 |
| | | | 73/514.29 |
| 2003/0131664 A1 | 7/2003 | Mochida et al. | |
| 2005/0024527 A1 | 2/2005 | Chiou | |
| 2005/0092085 A1 | 5/2005 | Chen et al. | |
| 2005/0139005 A1 | 6/2005 | Geen | |
| 2005/0284223 A1 | 12/2005 | Karaki et al. | |
| 2006/0213265 A1 | 9/2006 | Weber et al. | |
| 2007/0062282 A1 | 3/2007 | Akashi et al. | |
| 2007/0245826 A1 | 10/2007 | Cardarelli | |
| 2008/0238537 A1 | 10/2008 | Belt et al. | |
| 2008/0271532 A1 | 11/2008 | Platt et al. | |
| 2008/0282833 A1 | 11/2008 | Chaumet | |
| 2009/0223277 A1 | 9/2009 | Rudolf et al. | |
| 2009/0260436 A1 | 10/2009 | Tochi et al. | |
| 2010/0116050 A1 | 5/2010 | Wolfram | |
| 2010/0132461 A1 | 6/2010 | Hauer et al. | |
| 2010/0236327 A1 | 9/2010 | Mao | |
| 2010/0300201 A1 | 12/2010 | Ge et al. | |
| 2010/0313657 A1 | 12/2010 | Trusov et al. | |
| 2012/0060604 A1 | 3/2012 | Neul et al. | |
| 2012/0125099 A1 | 5/2012 | Scheben et al. | |
| 2012/0198934 A1 | 8/2012 | Cardarelli | |
| 2012/0210788 A1 | 8/2012 | Günther et al. | |
| 2012/0222483 A1 | 9/2012 | Blomqvist et al. | |
| 2012/0310067 A1 | 12/2012 | Najafi et al. | |
| 2013/0192363 A1 | 8/2013 | Loreck | |
| 2013/0269413 A1 | 10/2013 | Tao et al. | |
| 2014/0190258 A1 | 7/2014 | Donadel et al. | |
| 2014/0192061 A1 | 7/2014 | Payne et al. | |
| 2014/0260608 A1 | 9/2014 | Lin et al. | |
| 2014/0260610 A1 * | 9/2014 | McNeil | G01C 19/5712 |
| | | | 73/504.12 |
| 2015/0128701 A1 | 5/2015 | Vohra et al. | |
| 2015/0226558 A1 | 8/2015 | Seeger et al. | |
| 2015/0285633 A1 | 10/2015 | Kamal Said Abdel Aziz et al. | |
| 2015/0316378 A1 | 11/2015 | Kergueris et al. | |
| 2015/0330783 A1 | 11/2015 | Rocchi et al. | |
| 2015/0336790 A1 | 11/2015 | Geen et al. | |
| 2016/0025493 A1 | 1/2016 | Stewart | |
| 2016/0033274 A1 | 2/2016 | Reinmuth et al. | |
| 2016/0264404 A1 | 9/2016 | Acar | |
| 2016/0265916 A1 | 9/2016 | Kergueris et al. | |
| 2016/0316146 A1 | 10/2016 | Kajimura | |
| 2016/0349056 A1 | 12/2016 | Thompson et al. | |
| 2018/0038887 A1 | 2/2018 | Zhang et al. | |
| 2018/0058853 A1 | 3/2018 | Jia et al. | |
| 2018/0172445 A1 * | 6/2018 | Prikhodko | G01C 19/574 |
| 2018/0172446 A1 | 6/2018 | Prikhodko et al. | |
| 2018/0172447 A1 * | 6/2018 | Prikhodko | G01C 19/5747 |
| 2018/0216935 A1 | 8/2018 | Senkal et al. | |
| 2018/0299269 A1 | 10/2018 | Anac et al. | |
| 2018/0340775 A1 | 11/2018 | Kuisma | |
| 2019/0033075 A1 | 1/2019 | Wu et al. | |
| 2019/0187169 A1 | 6/2019 | Tang et al. | |
| 2019/0310087 A1 * | 10/2019 | Gregory | G01C 19/5712 |
| 2019/0383612 A1 * | 12/2019 | Geisberger | G01C 19/5747 |
| 2020/0025790 A1 | 1/2020 | Reinke | |
| 2020/0081029 A1 | 3/2020 | Zhang et al. | |

(56) References Cited

U.S. PATENT DOCUMENTS

| | | | |
|---|---|---|---|
| 2020/0132716 | A1 | 4/2020 | Zhang |
| 2020/0249020 | A1 | 8/2020 | Prikhodko et al. |
| 2020/0263987 | A1 | 8/2020 | Blomqvist et al. |
| 2020/0408801 | A1 | 12/2020 | Vohra et al. |
| 2021/0381833 | A1 | 6/2021 | Vohra |
| 2021/0278847 | A1 | 9/2021 | Prikhodko et al. |
| 2022/0057208 | A1 | 2/2022 | Prikhodko et al. |

FOREIGN PATENT DOCUMENTS

| | | |
|---|---|---|
| CN | 105366627 B | 3/2017 |
| CN | 206321662 U | 7/2017 |
| CN | 107782299 A | 3/2018 |
| CN | 108204806 A | 6/2018 |
| CN | 106932609 B | 5/2019 |
| CN | 209024198 U | 6/2019 |
| CN | 209841242 U | 12/2019 |
| CN | 110902640 A | 3/2020 |
| CN | 111148000 A | 5/2020 |
| JP | 2011145129 A | 7/2011 |
| JP | 5143267 B2 | 2/2013 |
| JP | 2014-510271 | 4/2014 |
| KR | 20110018926 A | 2/2011 |
| KR | 101776583 B1 | 9/2017 |
| WO | WO 2009/145967 A1 | 12/2009 |
| WO | WO 2012/120190 A2 | 9/2012 |

OTHER PUBLICATIONS

International Search Report and Written Opinion for International Application No. PCT/US2021/036259, dated Sep. 15, 2021.
International Search Report and Written Opinion for International Application No. PCT/US2021/47387, dated Nov. 23, 2021.
Miao et al., A novel method of quadrature compensation in the butterfly resonator based on modal stiffness analysis. AIP Advances. Oct. 22, 2018;8(10):105025.
Kranz et al., Micromechanical vibratory rate gyroscopes fabricated in conventional CMOS. Proc. Symposium Gyro Technology. Deutsche Gesellschaft Fuer Ortung Und Navigation, 1997. Stuttgart ,Germany. Sep. 16-17; pp. 3.0-3.8.
Kranz, Design, Simulation and Implementation of Two Novel Micromechanical Vibratory-Rate Gyroscopes. Department of Electrical and Computer Engineering. Carnegie Mellon University. May 1988. 41 pages.
Kumar et al., Amplitude modulated Lorentz force MEMS magnetometer with picotesla sensitivity. Journal of Micromechanics and Microengineering. Sep. 20, 2016; 26(10): http://iopscience.iop.org/article/10.1088/0960-1317/26/10/105021/meta#fnref-jmmaa3949bib003.
Li et al., Design and Mechanical Sensitivity Analysis of a MEMS Tuning Fork Gyroscope with an Anchored Leverage Mechanism. Sensors. Aug. 7, 2019; 19:3455.
Li et al., Three-Axis Lorentz-Force Magnetic Sensor for Electronic Compass Applications. Journal of Microelectromechanical Systems. Aug. 2012;21(4):1002 http://ieeexplore.ieee.org/stamp/stamp.jsp?arnumber-6198750.
Liu, Flexure Design for Eight-Bar Rectilinear Motion Mechanism. Thesis submitted in partial satisfaction of the requirements for the degree of Master of Science in Mechanical and Aerospace Engineering. UC Irvine Electronic Theses and Dissertations. 2015; 70 pages.
Park et al., Dynamics and control of a MEMS angle measuring gyroscope. Sensors and Actuators A: Physical 144.1 (2008): 56-63.
Prikhodko et al., Foucault Pendulum on a Chip: Angle Measuring Silicon Mems Gyroscope. 2011 IEEE 24th International Conference on Micro Electro Mechanical Systems (MEMS 2011), Cancun, Mexico. Jan. 23-27, 2011;161-4.
Trusov et al., Flat Is Not Dead: Current and Future Performance of Si-MEMS Quad Mass Gyro (QMG) System. 2014 IEEE/ION Position, Location and Navigation Symposium. (PLANS 2014). May 5-8, 2014. 7 pages.
Trusov et al., Force Rebalance, Whole Angle, and Self-Calibration Mechanization of Silicon MEMS Quad Mass Gyro. IEEE 2014 International Symposium on Inertial Sensors and Systems (ISISS). Feb. 25-26, 2014;149-50.
Zaman et al., A mode-matched silicon-yaw tuning-fork gyroscope with subdegree-per-hour Allan deviation bias instability. Journal of Microelectromechanical Systems 17.6 (2008): 1526-36.
U.S. Appl. No. 17/410,924, filed Aug. 24, 2021, Prikhodko et al.
PCT/US2021/036259, Sep. 15, 2021, International Search Report and Written Opinion.
PCT/US2021/036190, Sep. 10, 2021, International Search Report and Written Opinion.
PCT/US2021/47387, Nov. 23, 2021, International Search Report and Written Opinion.
International Preliminary Report on Patentability dated Dec. 22, 2022 in connection with International Application No. PCT/US2021/036259.
International Preliminary Report on Patentability dated Dec. 22, 2022 in connection with International Application No. PCT/US2021/036190.

* cited by examiner

STRESS-RELIEF MEMS GYROSCOPE

CROSS-REFERENCE TO RELATED APPLICATIONS

This application claims the benefit under 35 U.S.C. § 119(e) of U.S. Provisional Patent Application Ser. No. 63/036,273, filed Jun. 8, 2020, and entitled "DRIVE AND SENSE STRESS RELIEF APPARATUS," which is hereby incorporated by reference herein in its entirety.

This application claims the benefit under 35 U.S.C. § 119(e) of U.S. Provisional Patent Application Ser. No. 63/069,656, filed Aug. 24, 2020, and entitled "STRESS-RELIEF MEMS GYROSCOPE," which is hereby incorporated by reference herein in its entirety.

FIELD

The present application relates to kinematic linkages for microelectromechanical systems (MEMS) inertial sensors.

BACKGROUND

MEMS devices may comprise multiple moving masses coupled together by one or more couplers. For example, gyroscopes (sometimes referred to simply as "gyros") are devices which are sensitive to rotation, and therefore which can be used to detect rotation. Microelectromechanical systems (MEMS) gyroscopes typically include a movable body, sometimes referred to as a "proof mass," to which an electrical signal is applied to produce motion predominantly along a particular axis. This is referred to as driving the proof mass, and the axis along which the proof mass is driven is sometimes referred to as the drive axis. When the gyroscope experiences rotation, the proof mass additionally moves along an axis different than the drive axis, sometimes referred to as the sense axis. The motion of the proof mass along the sense axis is detected, providing an indication of the rotation experienced by the gyroscope. For some MEMS gyroscopes, driving the proof mass may comprise causing motion of the proof mass in-plane. For some MEMS gyroscopes, rotation may be detected by sensing out-of-plane motion of the proof mass.

BRIEF SUMMARY

According to some aspects, there is provided a MEMS device, comprising: a substrate; a proof mass coupled to the substrate and configured to move along a resonator axis; a drive structure comprising at least one electrode and being configured to drive the proof mass to move along the resonator axis; and a pivoting linkage coupling the proof mass at first and second ends of the pivoting linkage, the first end comprising a first fixed pivot and the second end comprising a second fixed pivot, the pivoting linkage comprising: a first bar configured to pivot about the first fixed pivot and a first dynamic pivot; a second bar configured to pivot about the second fixed pivot and a second dynamic pivot; and a third bar configured to pivot about the first dynamic pivot and the second dynamic pivot, wherein the proof mass is configured to move along the resonator axis when the pivoting linkage pivots.

According to some aspects, there is provided a MEMS device, comprising: a substrate; a proof mass coupled to the substrate and configured to move along a first axis in response to rotation of the MEMS device; a sense structure comprising at least one electrode and being configured to move along the first axis; and a pivoting linkage coupling the sense structure to the proof mass at first and second ends of the pivoting linkage, the first end comprising a first fixed pivot and the second end comprising a second fixed pivot, the pivoting linkage comprising: a first bar configured to pivot about the first fixed pivot point and a first dynamic pivot; a second bar configured to pivot about the second fixed pivot and a second dynamic pivot; and a third bar configured to pivot about the first dynamic pivot and the second dynamic pivot, wherein the pivoting linkage is configured to pivot when the proof mass moves along the first axis.

According to some aspects, there is provided a MEMS device, comprising: a proof mass configured to move along a first axis; a drive structure comprising at least one electrode and being configured to drive the proof mass along the first axis; and a linkage coupling the proof mass to the at least one drive structure, wherein the linkage comprises: a first lever coupled to the proof mass at a first end of the first lever; a first spring coupled to the first lever at a second end of the first lever; a second lever coupled to the proof mass at a first end of the second lever; a second spring coupled to the second lever at a second end of the second lever; wherein the first and second springs are coupled together; and wherein the linkage is configured to pivot about first and second dynamic pivots of the first spring and first and second dynamic pivots of the second spring.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear. For purposes of clarity, not every component may be labeled in every drawing.

DETAILED DESCRIPTION

Figure 1A:
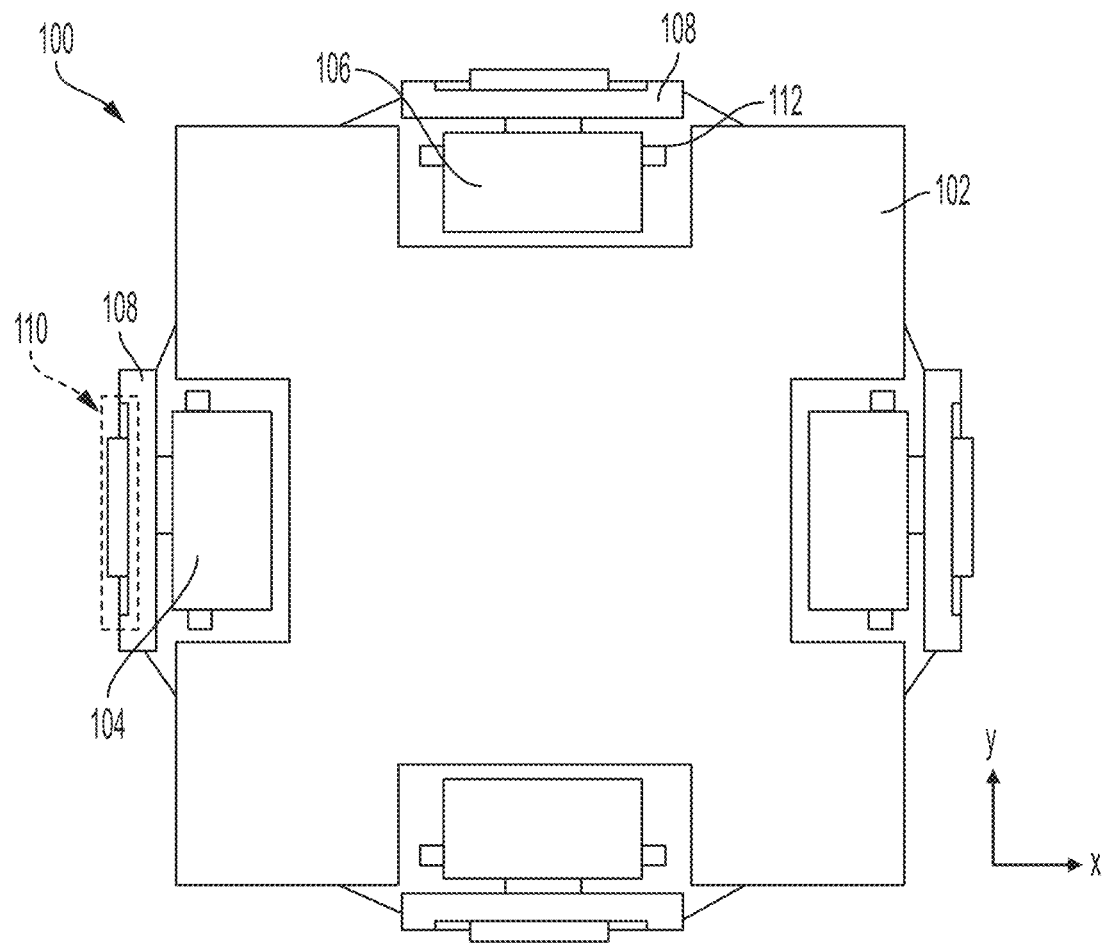
FIGS. 1A-1C are schematic diagrams of example MEMS devices having a pivoting linkage, according to some non-limiting embodiments.

Aspects of the present application provide for microelectromechanical systems (MEMS) devices having kinematic pivoting linkages which may reduce quadrature, shear and normal stress sensitivities, and cubic stiffness. According to some aspects, the pivoting linkages comprise more than two bars, for example, three bars, four bars, or five bars. Each bar of the pivoting linkage may be configured to pivot at respective ends of the bar.

A MEMS gyroscope may comprise at least one proof mass configured to facilitate detection of angular rates through detection of Coriolis forces. The Coriolis Effect, and hence a Coriolis force, arises when (1) a proof mass oscillates; and (2) the gyroscope is subjected to angular motion. The proof mass may be suspended above an underlying substrate. In a drive mode, the proof mass is configured to be displaced along a first axis. Displacement of the proof mass in the drive mode may be facilitated by one or more drive structures coupled to the proof mass. A Coriolis force arises when the proof mass undergoes angular motion about a second axis, causing the proof mass to be displaced along a third axis. Sense structures coupled to the proof mass may sense the displacement of the proof mass along the third axis to measure rotation of the MEMS gyroscope.

Coupling of the proof mass to the one or more drive and sense structures may be facilitated by one or more shuttles. In particular, the one or more drive and sense structures may each be coupled to a pivoting linkage, and the pivoting linkage may be coupled to the proof mass through a shuttle. However, in some embodiments, the MEMS gyroscope may not include the one or more shuttles, and the pivoting linkage may be directly coupled to the proof mass. Shuttles may suppress misalignment of the drive and/or sense mode by resisting motion orthogonal to the desired motion.

The pivoting linkage facilitates transfer of motion between the drive and sense structures and the proof mass to enable the proof mass displacement in the drive mode and detection of displacement caused by Coriolis forces in the sense mode. The pivoting linkages may comprise two segments, which may be referred to herein as levers, connected together by a connector. The levers may also serve as intermediate structures between the proof mass and the underlying substrate and may be flexible and/or bendable to facilitate the transfer of motion between the proof mass and drive and/or sense structures.

Gyroscopes of the types described herein are susceptible to certain sources of error which may cause erroneous detection of rotation and damage to the MEMS gyroscope over time. For example, MEMS gyroscopes are susceptible to errors arising from quadrature, shear and normal stress, and cubic stiffness. Quadrature is motion of the proof mass in the direction orthogonal to the drive motion, which is ideally 90° out of phase with the Coriolis response. Sources of quadrature include tilt of the MEMS device and sidewall angle asymmetry. Typically, quadrature is undesirable, as the gyroscope may be unable to distinguish between electrical signals resulting from quadrature as opposed to those resulting from rotation, and thus the accuracy of the gyroscope at detecting rotation may be negatively impacted by the occurrence of quadrature. Normal stress occurs due to a load applied normal (i.e. perpendicular) to a member (e.g., tension or compression) while shear stress occurs due to a load applied parallel to a member (e.g., skewing). Normal stress may lead to a change in frequency split between the drive and sense modes, while shear stress may lead to a change in quadrature signal of the gyroscope. Cubic stiffness represents non-linearities arising due to spring hardening caused by extension of a beam (e.g., the connector of the pivoting linkage).

MEMS gyroscopes may account for quadrature through use of a pivoting linkage comprising a single connector coupling the levers together. The pivoting linkage reduces or prevents quadrature entirely. For example, the pivoting linkage is permitted to bend as the connector flexes when a shuttle moves linearly away from the pivoting linkage. The connector may resist torsion and/or shear, thereby inhibiting tilt of the pivoting linkage and preventing quadrature motion of the gyroscope by inhibiting unwanted rotation or tilt of the shuttle and the proof mass connected to it, while allowing the desired linear motion.

However, the inventors have recognized that pivoting linkages having only two bars may be vulnerable to other sources of error, including shear and normal stress sensitivities and cubic stiffness as described herein. The inventors have recognized that these error sources may be reduced in MEMS devices by implementing a kinematic pivoting linkage having more than two bars. For example, in some embodiments, the pivoting linkage comprises three bars, four bars, or five bars. Each pivoting linkage may have fixed pivots at ends of the pivoting linkage (e.g., ends coupled to a proof mass) and a number of dynamic pivots between bars of the pivoting linkage. For example, a three bar linkage may comprise at least two dynamic pivots, a four bar linkage may comprise at least three dynamic pivots, and a five bar linkage may comprise at least four dynamic pivots.

Each type of pivoting linkage (e.g., three bar, four bar, and five bar, etc.) can be implemented using a number of different designs. Each of the different types and designs of pivoting linkages may address one or more different error sources (e.g., quadrature, shear stress, normal stress, cubic stiffness), and the type and design of pivoting linkage implemented may be selected based on the error source(s) desired to be addressed.

Thus, according to an aspect of the present application, there is provided a MEMS device, comprising a substrate; a proof mass coupled to the substrate and configured to move along a resonator axis; a drive structure comprising at least one electrode and being configured to drive the proof mass to move along the resonator axis; and a pivoting linkage coupled to the proof mass at first and second ends of the pivoting linkage, the first end comprising a first fixed pivot and the second end comprising a second fixed pivot, the pivoting linkage comprising a first bar configured to pivot about the first fixed pivot and a first dynamic pivot; a second bar configured to pivot about the second fixed pivot and a second dynamic pivot; and a third bar configured to pivot about the first dynamic pivot and the second dynamic pivot, wherein the proof mass is configured to move along the resonator axis when the pivoting linkage pivots.

In some embodiments, there is provided a MEMS device, comprising a substrate; a proof mass coupled to the substrate and configured to move along a first axis in response to rotation of the MEMS device; a sense structure comprising at least one electrode and being configured to move along the first axis; and a pivoting linkage coupling the sense structure to the proof mass at first and second ends of the pivoting linkage, the first end comprising a first fixed pivot and the second end comprising a second fixed pivot, the pivoting linkage comprising a first bar configured to pivot about the first fixed pivot point and a first dynamic pivot; a second bar configured to pivot about the second fixed pivot and a second dynamic pivot; and a third bar configured to pivot about the first dynamic pivot and the second dynamic pivot; wherein the pivoting linkage is configured to pivot when the proof mass moves along the first axis.

In some embodiments, there is provided a MEMS device, comprising a proof mass configured to move along a first axis; a drive structure comprising at least one electrode and being configured to drive the proof mass along the first axis; and a linkage coupling the proof mass to the at least one drive structure, wherein the linkage comprises: a first lever coupled to the proof mass at a first end of the first lever; a first spring coupled to the first lever at a second end of the first lever; a second lever coupled to the proof mass at a first end of the second lever; a second spring coupled to the second lever at a second end of the second lever; wherein the first and second springs are coupled together; and wherein the linkage is configured to pivot about first and second dynamic pivots of the first spring and first and second dynamic pivots of the second spring.

The aspects and embodiments described above, as well as additional aspects and embodiments, are described further below. These aspects and/or embodiments may be used individually, all together, or in any combination, as the technology is not limited in this respect.

Figure 1B:
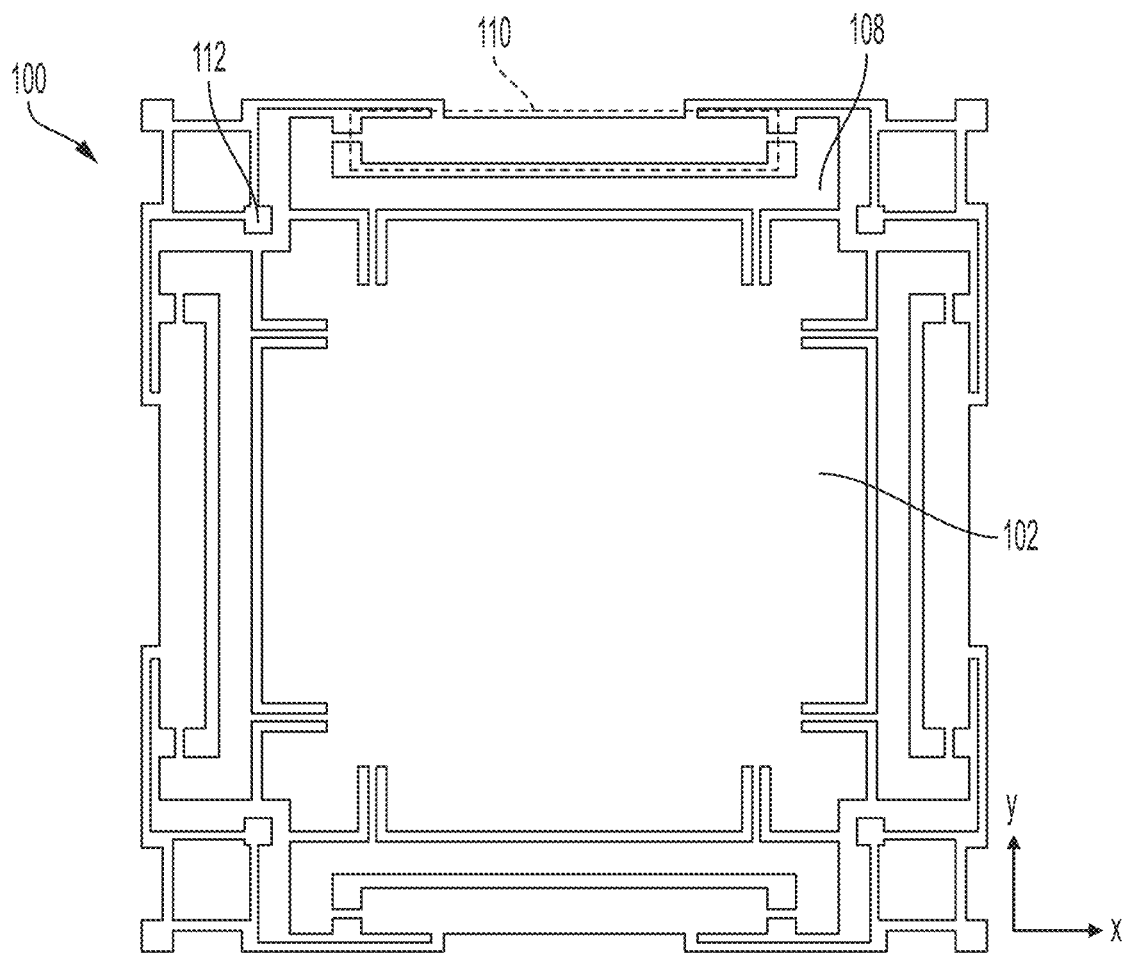
Figure 1C:
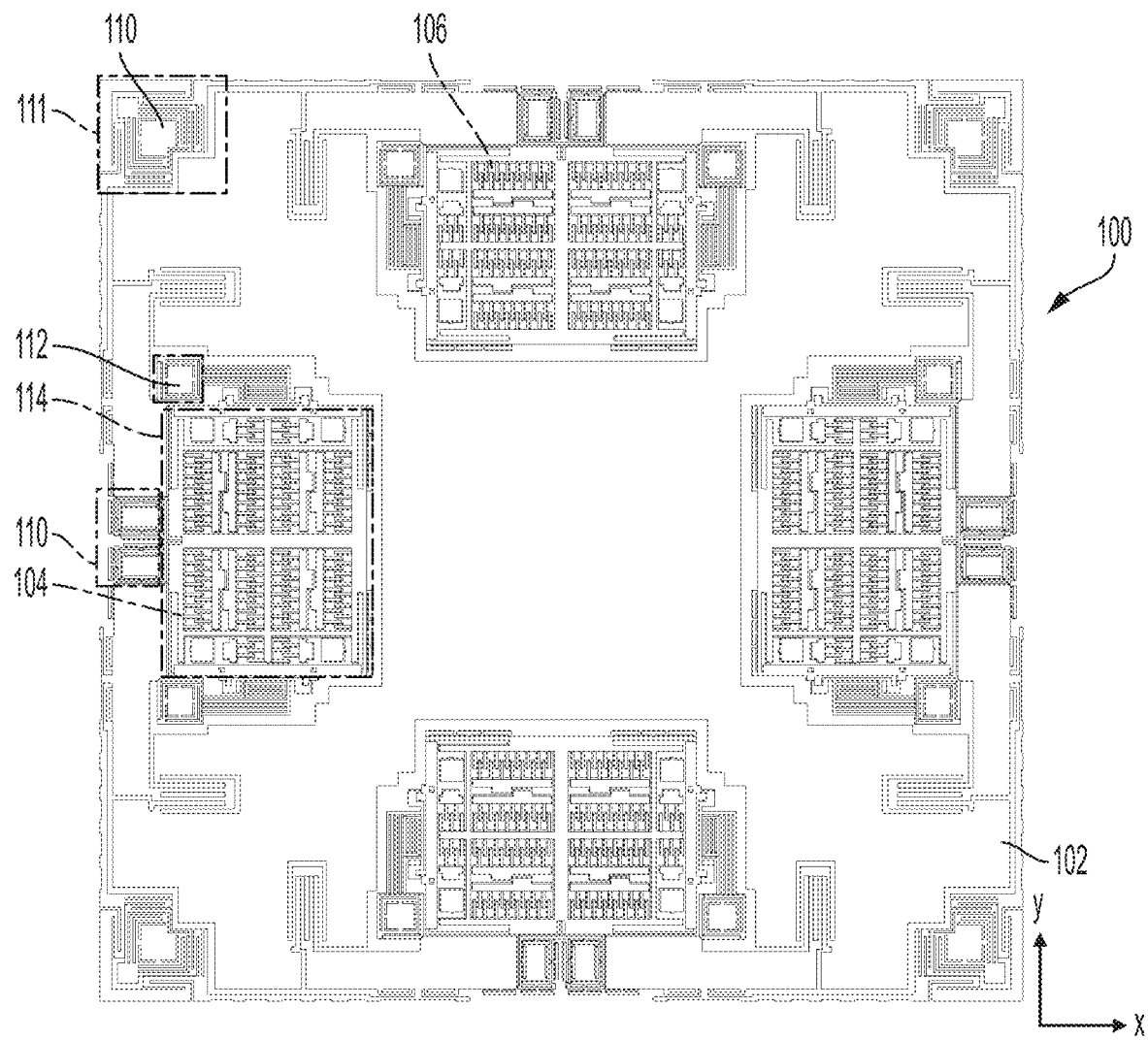

FIGS. 1A-1C are schematic diagrams of example MEMS devices 100 having a pivoting linkage 110, according to some non-limiting embodiments. In particular, FIG. 1A illustrates a MEMS device 100 having a proof mass 102 configured to facilitate detection of angular rates. The proof mass 102 may be suspended above and coupled to an underlying substrate (not shown). As described herein, the proof mass 102 may be configured to oscillate due to a displacement generated by one or more drive structures 104 coupled to the proof mass 102. For example, the proof mass 102 may be configured to move along a first axis (e.g., the x-axis) and a second axis substantially perpendicular to the first axis (e.g., the y-axis). In some embodiments, the proof mass 102 may be configured to move in-plane and/or out-of-plane.

MEMS device 100 further comprises drive structures 104 and sense structures 106. A drive structure is a structure configured to cause motion of a proof mass of the MEMS device 100. Drive structures 104 may include drive capacitors, in which electrostatic forces are used to cause motion of the proof mass 102. For example, a drive structure 104 may comprise a first plurality of electrodes being spaced a distance from a second plurality of electrodes which are coupled to the underlying substrate. A voltage may be applied to the second plurality of electrodes causing the distance between the first and second plurality of electrodes to change. The drive structures may therefore oscillate in response to the voltage applied to the second plurality of electrodes by virtue of the change in distance between the first and second plurality of electrodes. Motion of the drive structures 104 may be transferred to the proof mass 102 as further described herein.

A sense structure is a structure configured to detect motion of a proof mass of the MEMS device 100. For example, sense structures 106 may sense motion of the proof mass 102 caused by Coriolis forces arising when the proof mass 102 undergoes angular motion. Motion of the proof mass 102 caused by Coriolis forces may be transferred to the sense structures 106 causing the sense structures to oscillate as further described herein. Sense structures 106 may include sense capacitors, in which electrostatic forces are generated when a distance between electrodes coupled to a sense structure and electrodes coupled to the underlying substrate is changed. The Coriolis translational motion of the proof mass may be determined based on the generated electrostatic Coriolis force due to angular rotation.

In the illustrated embodiments, the proof mass 102 comprises two drive structures and two sense structures. However, any suitable number of drive structures and sense structures may be implemented and coupled to the proof mass 102.

One or more anchors 112 may be provided for coupling components of the MEMS device 100 to an underlying substrate (not shown). For example, in the embodiment illustrated in FIG. 1A, anchors 112 are provided for coupling the drive and sense structures 104, 106 to an underlying substrate.

In a drive mode, the motion of the drive structure(s) 104 may be transferred to the proof mass 102 through one or more movable shuttles 108. Similarly, in a sense mode, the motion of the proof mass 102 may be transferred to the sense structure(s) 106 through one or more shuttles 108, as shown in FIG. 1A. A pivoting linkage 110, comprising two segments coupled together by a connector is provided being hingedly coupled to each of the shuttles 108, to facilitate the transfer of motion between the drive and sense structures 104, 106 and the proof mass 102. In particular, the movable shuttle 108 may be disposed between the pivoting linkage 110 and the proof mass 102.

As described herein, the pivoting linkage 110 may be configured having at least three bars. That is, the pivoting linkage may have at least three portions configured to pivot about pivots at first and second ends of each bar. Accordingly, a pivoting linkage having three bars comprises four pivots: first and second fixed pivots at first and second ends of the linkage, and first and second dynamic pivots between the first and second, and second and third bars of the linkage. Each bar of the linkage may be configured to pivot freely relative to the other bars of the linkage, in some embodiments.

As described herein, the pivoting linkage 110 may be coupled between the proof mass 102 and a drive structure 104 or a sense structure 106. In a drive mode of operation, the drive structure 104 may be caused to oscillate. Movement of the drive structure 104 may be transferred to the proof mass 102 via the pivoting linkage 110 and/or the shuttle 108. For example, movement of the drive structure 104 may cause bars of the pivoting linkage 110 to rotate, causing the pivoting linkage 110 to pivot. The pivoting of the pivoting linkage may push or pull the proof mass 102 due to the coupling between the pivoting linkage 110 and the proof mass 102. Accordingly, the motion of the drive structure 104 may be transferred to the proof mass 102 via the pivoting linkage 110.

Similarly, the pivoting linkage 110 and/or the shuttle 108 may transfer motion of the proof mass 102 to a sense structure 106. In a sense mode of operation, the proof mass 102 may be displaced due to a Coriolis force as further described herein. The displacement of the proof mass 102 may cause bars of the pivoting linkage 110 to rotate, causing the pivoting linkage 110 to pivot. The pivoting of the pivoting linkage 110 may push or pull the sense structure 106 due to the coupling between the pivoting linkage 110 and the sense structure. Accordingly, the motion of the proof mass 102 may be transferred to the sense structure 106 via the pivoting linkage.

A MEMS device 100 may comprise multiple pivoting linkages 110. For example, the MEMS device 100 may comprise a respective pivoting linkage 110 coupled to each of one or more drive structure 104 (e.g., two drive structures 104 as shown in FIG. 1A). In some embodiments, the MEMS device 100 may comprise a respective pivoting linkage 110 coupled to each of one or more sense structures 106 (e.g., two sense structures 106 as shown in FIG. 1A). In some embodiments, a respective pivoting linkage 110 may be coupled to each of a drive structure 104 and a sense structure 106, for example, as shown in the illustrate embodiment of FIG. 1A.

The inventors have recognized that implementing pivoting linkages of the types described herein between a proof mass and drive or sense structure of a MEMS device may reduce various forms of stress experienced by the MEMS device (e.g., cubic stiffness, normal stress sensitivity, shear stress sensitivity, and/or quadrature). Such stresses may lead to inaccuracies in the ability of the MEMS device to sense rotation. Accordingly, the pivoting linkages described herein provide for a MEMS device with improved sensing abilities.

FIGS. 1B-1C illustrate additional examples of MEMS devices 100 having pivoting linkages 110. For simplicity, drive and sense structures 104, 106 are omitted from the illustration in FIG. 1B. As shown in FIG. 1B, a pivoting linkage 110 is coupled to a proof mass 102 via a shuttle 108. One or more anchors 112 for coupling components of the MEMS device 100 to an underlying substrate are provided.

FIG. 1C illustrates an example of a MEMS device 100 having modified the shuttles 108 described herein. In the MEMS device of FIG. 1C, the pivoting linkages 110 are coupled to the drive and sense structures 104, 106 without use of the one or more shuttles shown in FIGS. 1A-1B but are instead coupled to the drive and sense structures 104, 106 directly.

It should be appreciated that the pivoting linkages illustrated in FIGS. 1A-1C have been simplified for ease of illustration. Further illustration and details of the pivoting linkages are provided herein.

Figure 2:
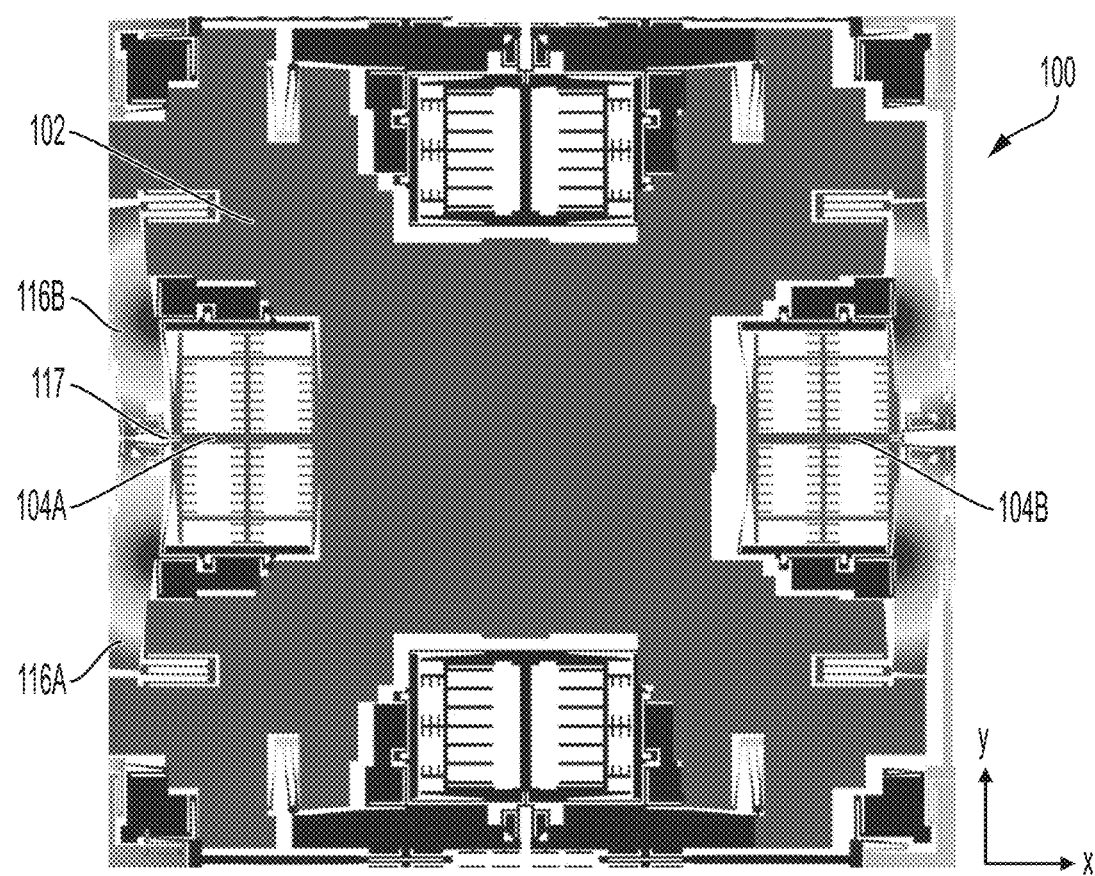
FIG. 2 illustrates motion of the example MEMS device of FIG. 1C in a drive mode, according to some non-limiting embodiments.

FIG. 2 illustrates motion of the example MEMS device of FIG. 1C in a drive mode, according to some non-limiting embodiments. The MEMS device 100 may be a MEMS gyroscope configured to detect angular rates through detection of Coriolis forces. In this example, the proof mass 102 is driven to oscillate along the x-axis, and a Coriolis force arises when the proof mass 102 undergoes angular motion in the plane of the page, about an out-of-plane axis (e.g., the z-axis) causing the proof mass to be displaced along the y-axis. The MEMS device 100 may be configured to sense the displacement of the proof mass to measure rotation.

As described herein, the MEMS device 100 may comprise one or more drive structures 104 configured to drive the proof mass along the x-axis. In the illustrated embodiment of FIG. 2, the MEMS device 100 comprises two drive structures 104A, 104B coupled to the proof mass 102 and disposed substantially opposite each other. Motion of the drive structures 104A, 104B may be transferred to the proof mass 102 via levers 116A, 116B. The pair of levers may form all or a part of the pivoting linkage described herein. A pair of levers 116 may be coupled to a respective drive structure 104. When the drive structure 104 oscillates, the pair of levers 116 may pivot, as shown in FIG. 1B, about pivot point 117. In some embodiments, each of the levers 116 have multiple pivot points, as described herein.

Figure 3:
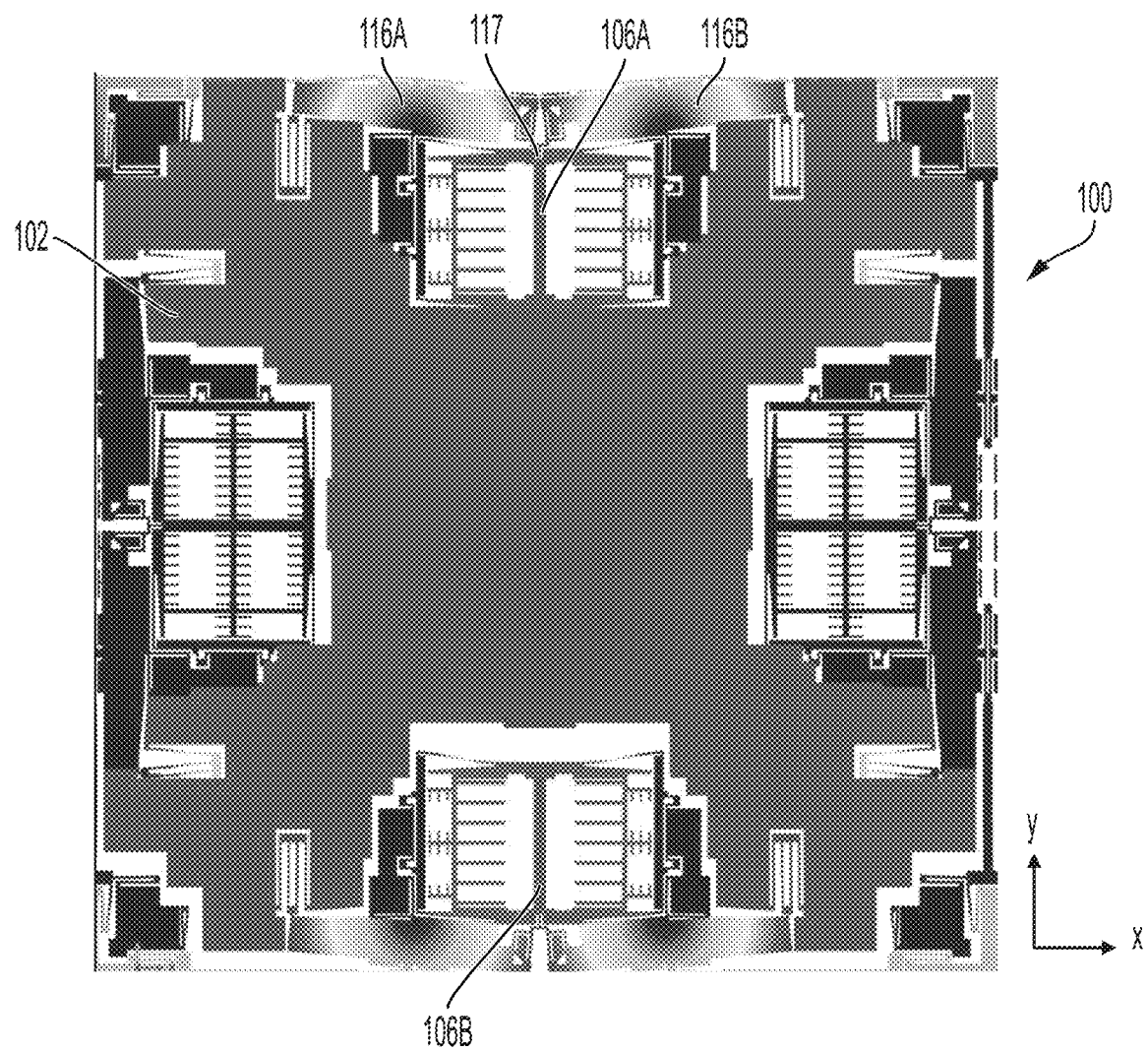
FIG. 3 illustrates motion of the example MEMS device of FIG. 1C in a sense mode, according to some non-limiting embodiments.

FIG. 3 illustrates motion of the example MEMS device 100 of FIG. 1C in a sense mode, according to some non-limiting embodiments. As shown in FIG. 3, the sense structures 106A, 106B are configured to sense motion of the proof mass 102 along the y-axis caused by Coriolis forces arising due to rotation of the proof mass 102 about the z-axis. Thus, the MEMS device 100 may be configured to sense rotation about an out-of-plane axis (e.g., the z-axis) by displacement of the proof mass 102 along the y-axis. Motion of the sense structures 106A, 106B may be coupled to the proof mass 102 via levers 116A, 116B A pair of levers 116 may be coupled to a respective sense structure 106. When the proof mass 102 oscillates, the pair of levers 116 may pivot, as shown in FIG. 1C, about pivot point 117. In some embodiments, each of the levers 116 have multiple pivot points, as described herein.

Although in the illustrated embodiment, the drive mode is configured being along the x-axis and the sense mode is along the y-axis, other configurations are possible. For example, drive and sense motion may be along any combination of the x, y, and/or z axes.

According to aspects of the technology described herein, a MEMS device may comprise pivoting linkages having more than two bars. FIGS. 4A-4D illustrate examples of a three bar pivoting linkage, according to some non-limiting embodiments. As shown in FIGS. 4A-4D, the pivoting linkage 400 includes two segments 116A, 116B (e.g., levers) coupled together by a connector 402. In the illustrated embodiment of FIG. 4A, in contrast to two bar pivoting linkages, the connector 404 is not directly coupled to the levers 116A, 116B, but rather the levers 116A, 116B are coupled together through a combination of springs 404, an inset 406, and the connector 402. The inventors have recognized that when the connector 402 coupling the segments 116A, 116B is permitted to bend, the connector may harden leading to unwanted stiffening, in particular where the displacement of the connector is on the order of microns. This bending may manifest as cubic stiffness which may lead to errors in the operation of the gyroscope.

Figure 4A:
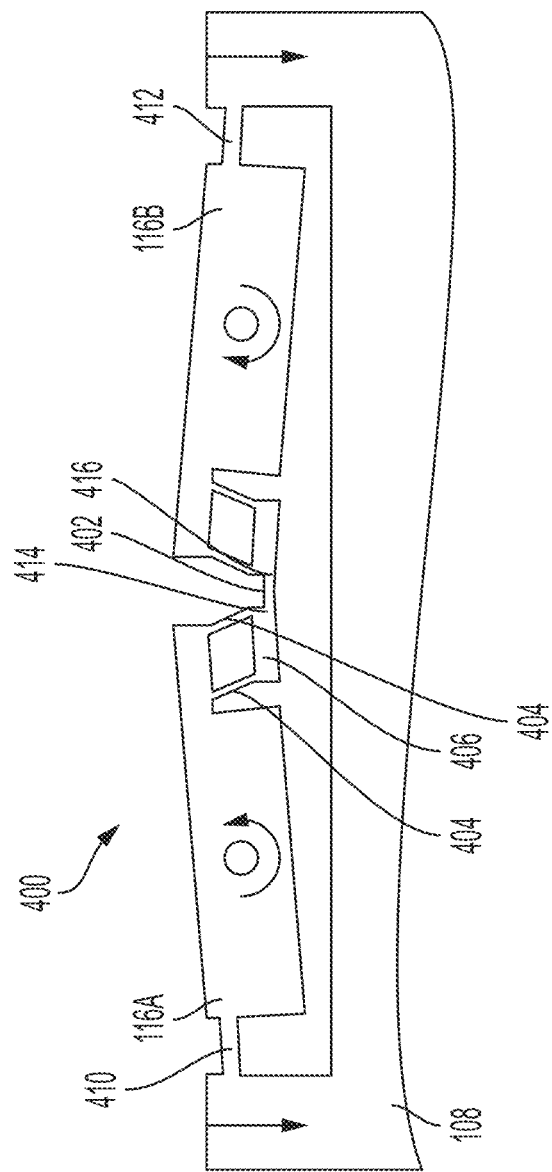
FIGS. 4A-4D illustrate examples of a three bar pivoting linkage, according to some non-limiting embodiments.

The three bar linkage has an additional degree of freedom relative to the two bar linkages. In particular, when proximal ends of the levers 116A, 116B both move in the same direction (e.g., by rotating in opposite directions), as shown in FIG. 4A, the additional degree of freedom prevents the connector 402 from bending resulting in cubic stiffness. In particular, the connector 402 is prevented from rotating relative to the proof mass when the first and second levers 116A, 116B rotate in opposite directions. Instead, the springs 404 allow the inset 406 coupled to each lever 116A, 116B to move. The beneficial reduction of quadrature as described with respect to the two bar linkage is still achieved by the three bar linkage, while also reducing or preventing entirely cubic stiffness.

The three bar linkage may also be viewed in terms of its pivots. For example, the first segment 116A may be considered a first bar, the second segment 116B may be considered a second bar, and the connector 402 may be considered a third bar. The first bar 116A may be coupled to the proof mass (e.g., via shuttle 108, in some embodiments) at a first end of the three bar linkage 400 (e.g., via a spring). The first end may comprise a first fixed pivot 410, wherein the first bar 116A is configured to pivot about the first fixed pivot 410. The second bar 116B may be coupled to the proof mass (e.g., via shuttle 108, in some embodiments) at a second end of the three bar linkage 400 (e.g., via a spring). The second end may comprise a second fixed pivot 412, wherein the second bar 116B is configured to pivot about the second fixed pivot 412.

As described herein, the first and second bars 116A, 116B may be coupled together by connector 402. The connector 402 may be configured to pivot relative to the first bar 116A about a first dynamic pivot 414. The connector 402 may be configured to pivot relative to the second bar 116B about a second dynamic pivot 416. Accordingly, the first, second, and third bars may be configured to pivot relative to each other via the dynamic pivots described herein.

Pivots may be dynamic in that the pivot is disposed between two components configured to pivot. For example, the first dynamic pivot 414 is disposed between first bar 116A and connector 402. Both first bar 116A and connector 402 are configured to pivot about each other. By contrast, where first bar 116 is coupled to shuttle 108 at first fixed pivot 410, only one component, the first bar 116A, is configured to pivot relative to the other component. For example, in some embodiments, a fixed pivot may be disposed at a point where a pivoting component (such as first bar 116A), is coupled to a component fixed relative to the underlying substrate of the MEMS device 100 (such as anchor 112).

Figure 4B:
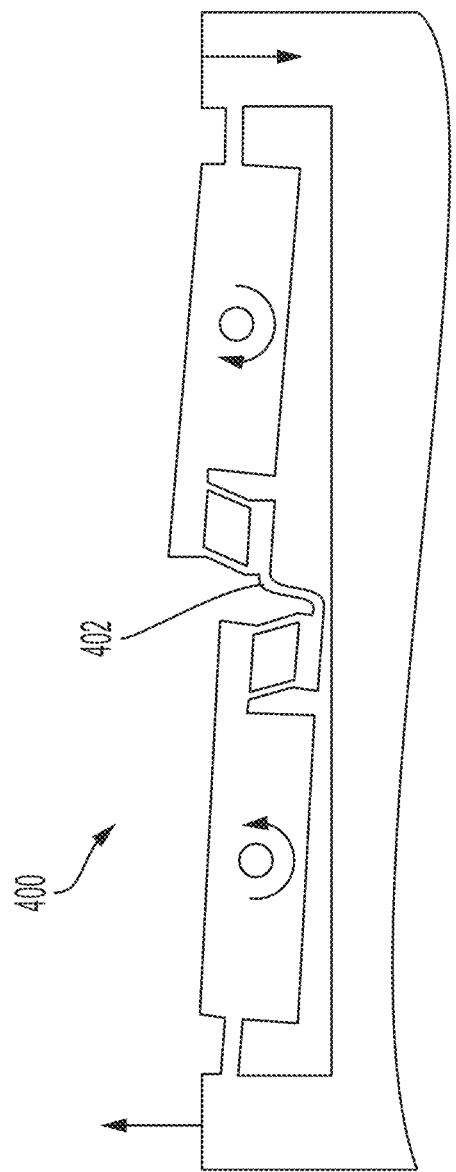

FIG. 4B illustrates the three bar linkage 400 of FIG. 4A where the first and second levers 116A, 116B are rotating in a same direction (e.g., where proximal ends of the first and second levers 116A, 116B move in opposite directions). The linkage mechanism comprising 402, 404, and 406 is preventing the tilt of the proof mass when the levers 116A, 116B move in the opposite direction, as shown in FIG. 4B. As shown in FIG. 4B, the connector 402 is not deforming when the first and second levers 116A, 116B rotate, preserving linearity of the mechanical linkage. The connector 402 is stiff enough to resist the bending in the form of S-shape as shown in FIG. 4B, thus preventing the tilt of the proof mass, hence reducing quadrature of the gyroscope. Thus, the three bar linkage 400 may reduce nonlinearity by lowering cubic stiffness without affecting the tilt stiffness ratio.

Figure 4C:
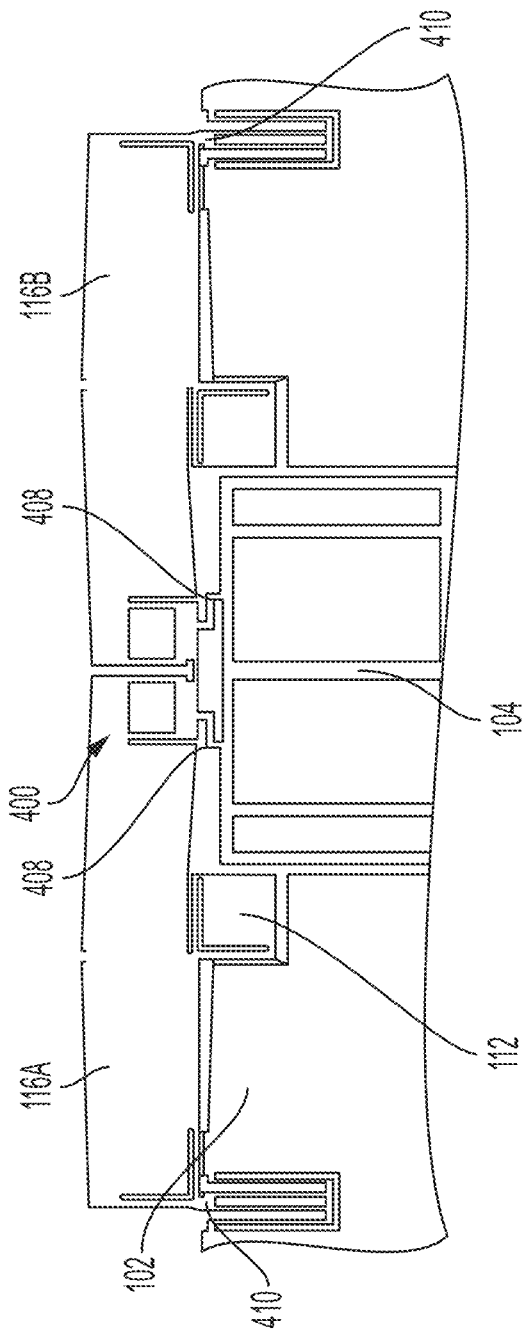
Figure 4D:
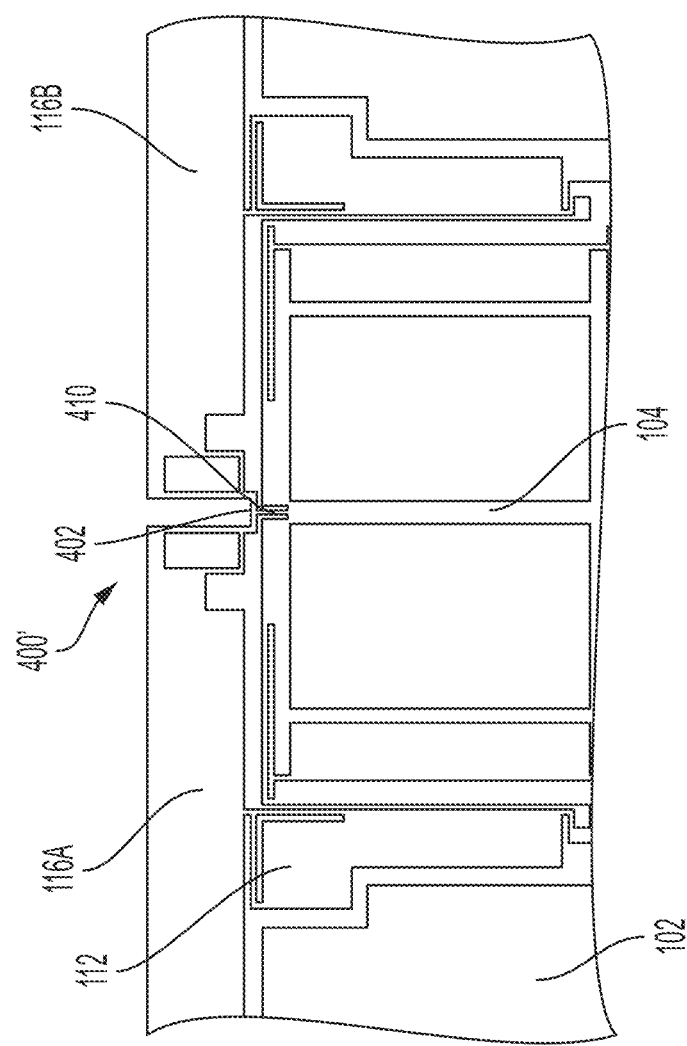

FIG. 4C illustrate examples of the three bar linkage 400 implemented in a MEMS device, where the three bar linkage 400 is coupled to a drive structure 104. FIG. 4D illustrates another example of a three bar linkage 400' where the three bar linkage 400' is coupled to a drive structure 104.

The three bar linkage may be coupled to the drive structure in any suitable manner. In FIG. 4C, the three bar linkage 400 is coupled to the drive structure with two folded springs 408. In FIG. 4D, the three bar linkage is coupled to the drive structure with a single spring 410.

In the illustrated embodiments of FIGS. 4C-4D, the three bar linkage 400, 400' is coupled to anchor 112. The anchor 112 may be coupled to an underlying substrate (not shown), as described herein. In the illustrated embodiment, each lever 116A, 116B is coupled to a respective anchor. However, any suitable number of anchors may be coupled to one or more of the levers 116A, 116B. In some embodiments, for example, as shown in FIG. 4D, a lever may be coupled to an anchor 112 at multiple points.

In the illustrated embodiment of FIG. 4C, first and second ends of the three bar linkage 400 are coupled to the proof mass 102. In the illustrated embodiment of FIG. 4C, the three bar linkage 400 is coupled directly to the proof mass via springs 410, without the use of a shuttle, however, other configurations are possible.

In some embodiments, first and second ends of the three bar linkage 400 may be coupled to the proof mass 102 via anchors 112. Accordingly, the first and second fixed pivots described herein may be about an anchor (e.g., anchor 112).

Figure 4E:
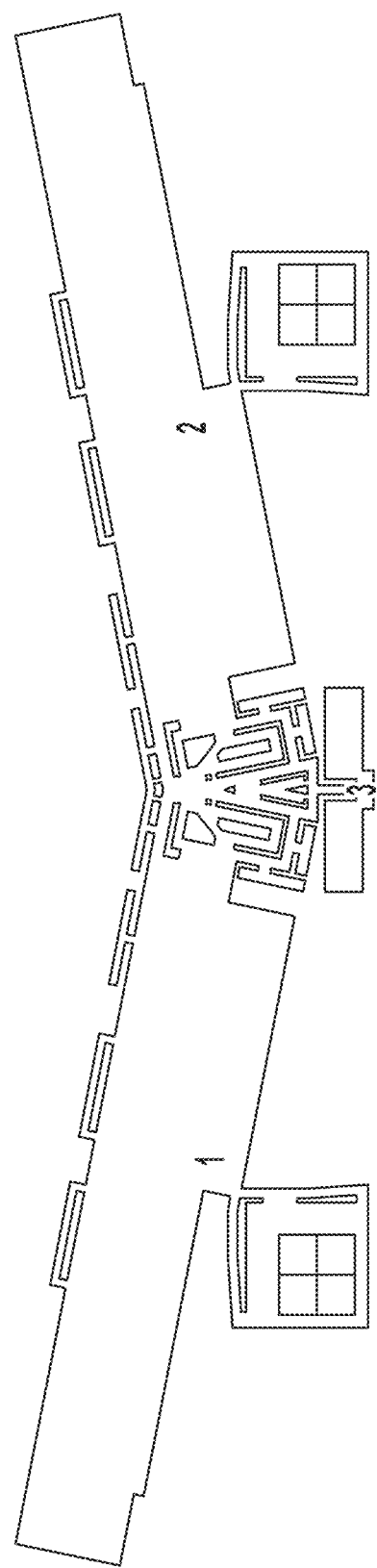
FIG. 4E illustrates the example three bar pivoting linkage of FIGS. 4A-4D in a normal mode of operation, according to some non-limiting embodiments.
Figure 4F:
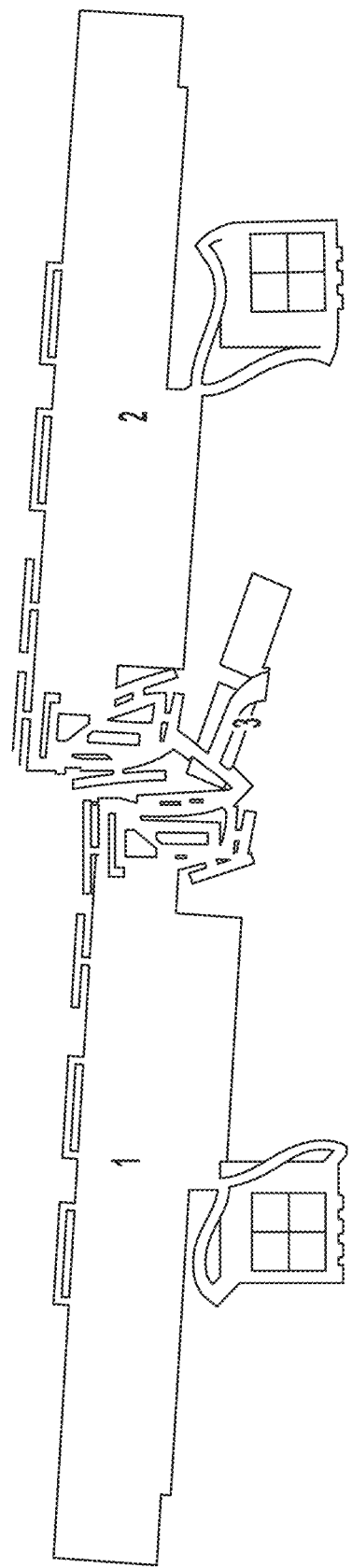
FIG. 4F illustrates the example three bar pivoting linkage of FIGS. 4A-4D in a tilt mode of operation, according to some non-limiting embodiments.

FIG. 4E illustrates the example three bar pivoting linkage of FIGS. 4A-4D in a normal mode of operation, according to some non-limiting embodiments. FIG. 4F illustrates the example three bar pivoting linkage of FIGS. 4A-4D in a tilt mode of operation, according to some non-limiting embodiments.

Figure 5A:
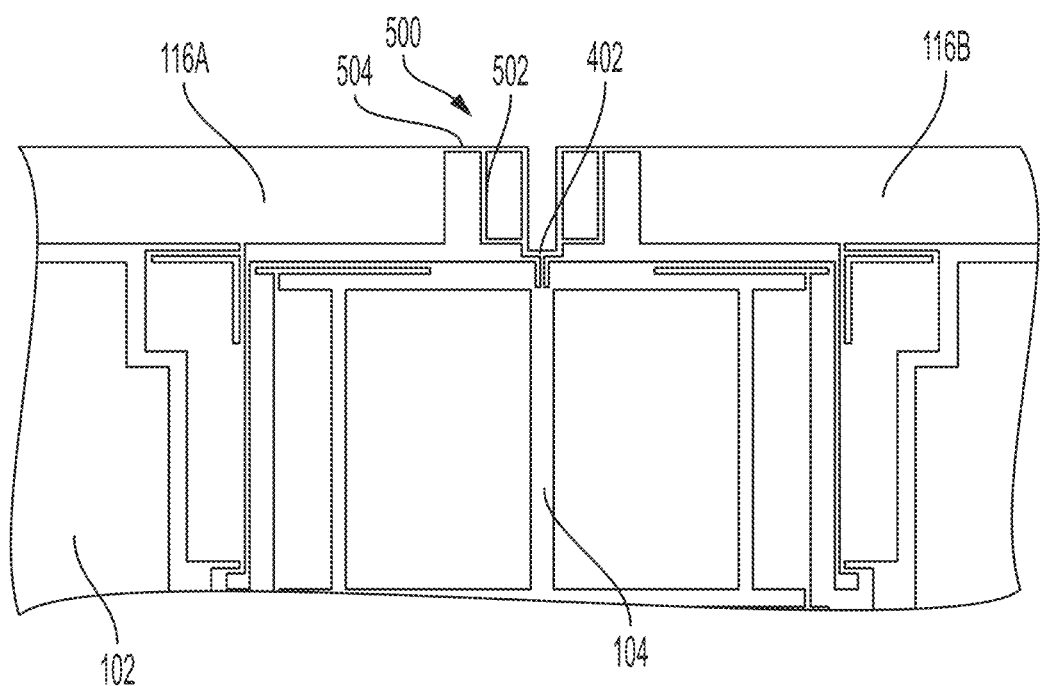
FIGS. 5A-5D illustrate examples of a four bar pivoting linkage, according to some non-limiting embodiments.

FIGS. 5A-5D illustrate examples of a four bar pivoting linkage 500, according to some non-limiting embodiments. As shown in FIG. 5A, the four bar pivoting linkage 500 may comprise box springs 502. The respective box springs 502 may be coupled to the respective levers 116, 116B through respective tethers 504, and to each other through a connector 402. In the illustrated embodiment, the four bar linkage is coupled to the drive structure 104 through a single t-shaped connection, however, other configurations are possible. For example, in some embodiments, the four bar linkage 500 may be coupled to the drive structure 104 through two or more springs.

The four bar linkage 500 may be viewed in terms of its pivots. For example, the first lever 116A may be considered a first bar, the second lever 116B may be considered a second bar, and the respective box springs 502 may be considered third and fourth bars of the pivoting linkage. As described herein, the first bar 116A may be coupled to the proof mass 102 at a first end of the four bar linkage 500 (e.g., via a spring and/or via anchor 112) and may be configured to pivot about a first fixed pivot point (not shown) The second bar 116B may be coupled to the proof mass at a second end of the four bar linkage 500 (e.g., via a spring and/or via anchor 112) and may be configured to pivot about a second fixed pivot point (not shown).

Figure 5B:
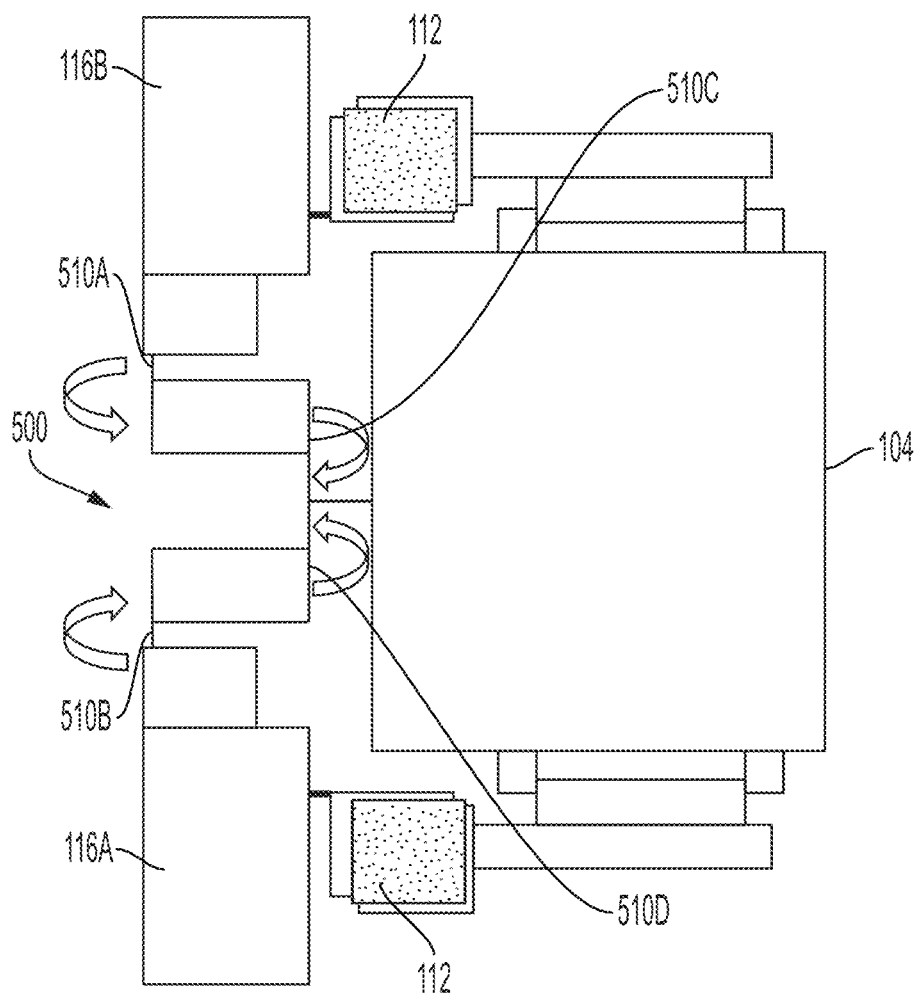
Figure 5C:
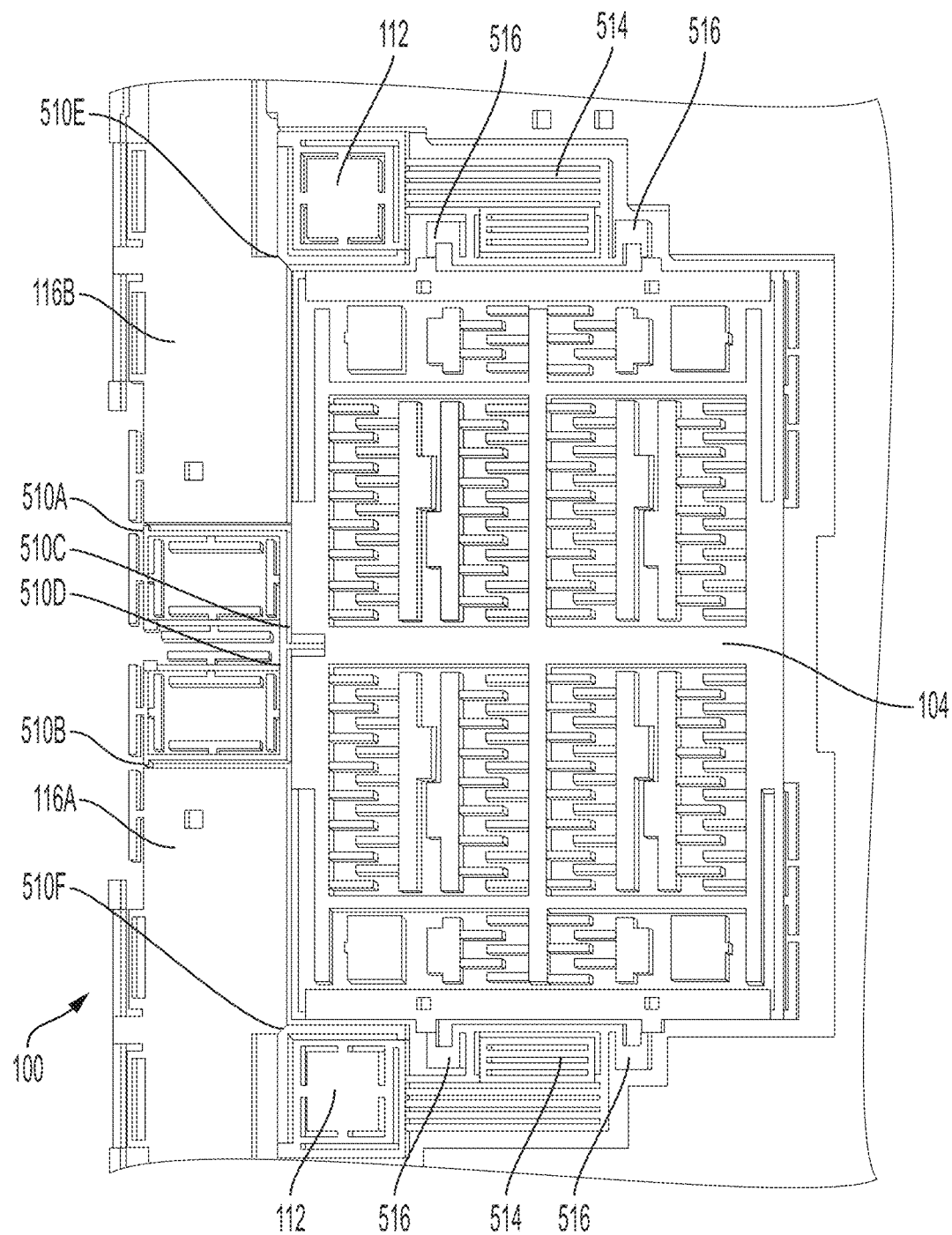

The first and second bars 116A, 116B may be coupled together via box springs 502 (e.g., third and fourth bars). The third bar may be coupled to first bar 116A at and configured to pivot about dynamic pivot 510B, as shown in FIGS. 5B-5C. The fourth bar may be coupled to the second bar 116B at and configure to pivot about second dynamic pivot 510A, as shown in FIGS. 5B-5C. The third and fourth bars may be coupled together at and configured to pivot about shared dynamic pivots 510C, 510D, as shown in FIGS. 5B-5C. Accordingly, the first, second, third, and fourth bars may be configured to pivot relative to each other via the dynamic pivots described herein. The inventors have recognized that the four bar linkage is advantageous for reducing sensitivity of the MEMS device to shear stress while also reducing cubic stiffness.

The four bar linkage 500 is coupled to anchor 112 in the illustrated embodiment of FIG. 5A. The anchor may be coupled to an underlying substrate (not shown), as described herein. In the illustrated embodiment, each lever 116A, 116B is coupled to a respective anchor. However, any suitable number of anchors may be coupled to one or more of the levers 116A, 116B. In some embodiments, for example, a lever may be coupled to an anchor at multiple points.

FIG. 5B is a schematic diagram illustrating the pivot points of four bar linkage 500 shown in FIG. 5A. As shown in FIG. 5B, the four bar linkage 500 has least two pivot points per lever. In particular, springs of the four bar linkage 500 comprises two pivots 510A-D, respectively. In the illustrated embodiment, the respective pivots 510A-D are disposed on opposing diagonals of each spring. As described herein, in some embodiments, the dual pivots 510A-D of the levers 116A, 116B may be implemented with a rectangular box spring.

FIG. 5C illustrates the four bar linkage 500 of FIG. 5A being coupled to a drive structure 104. As described herein, the four bar linkage 500 may transfer motion of the drive structure 104 in a drive mode to the proof mass of the MEMS device such that the proof mass is displaced when the four bar linkage 500 pivots due to oscillation of the drive structure 104.

As described herein, the four bar linkage 500 may be coupled to one or more anchors 112. As shown in the illustrated embodiment, the first lever 116A is coupled to an anchor 112 at a first point 510F and the second lever 116A is coupled to an anchor 112 at a second point. Points 510F and 510E may act as fulcrums about which the first and second levers 116A, 116B may pivot. In some embodiments, points 510F and 510 may comprise the first and second fixed pivots described herein.

Drive structure 104 may be coupled to one or more of anchors 112, in some embodiments. For example, as shown in FIG. 5C, drive structure 104 is coupled to an arm 514 (e.g., via one or more u-shaped springs 516). Arm 514 is then coupled to anchor 112. For example, as shown in FIG. 5C, arm 514 is coupled to anchor 112 at a plurality of points. In the illustrated embodiment, the drive structure 104 is coupled to two anchors 112, however, the drive structure 104 may be coupled to any suitable number of anchors.

Figure 5D:
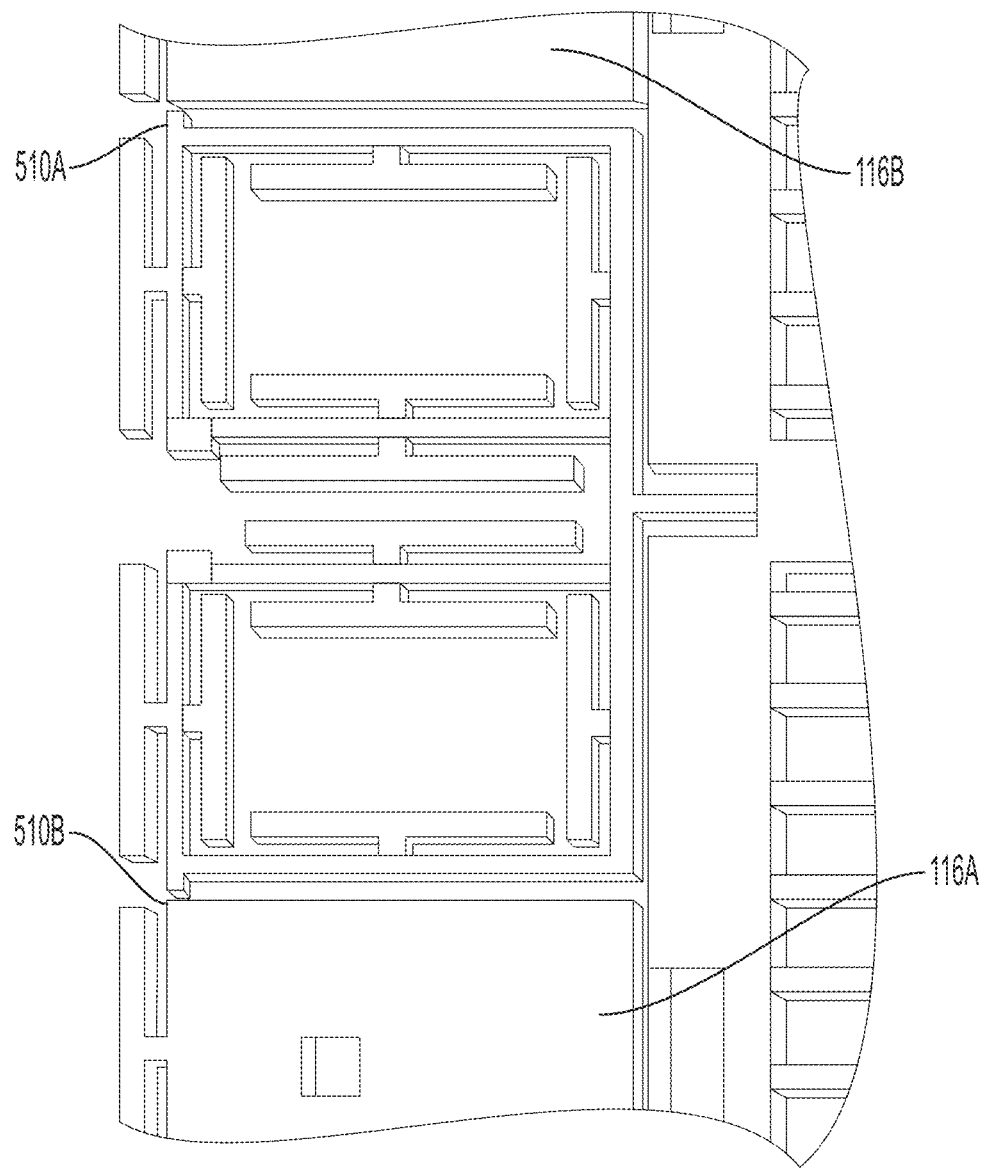
Figure 5E:
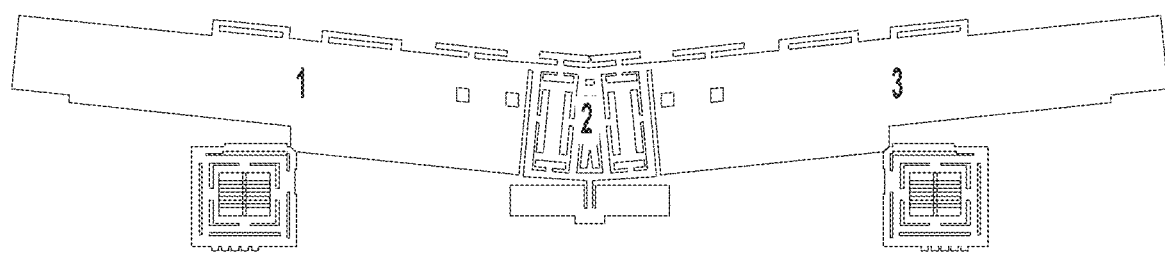
FIG. 5E illustrates the example four bar pivoting linkage of FIGS. 5A-5D in a normal mode of operation, according to some non-limiting embodiments.
Figure 5F:
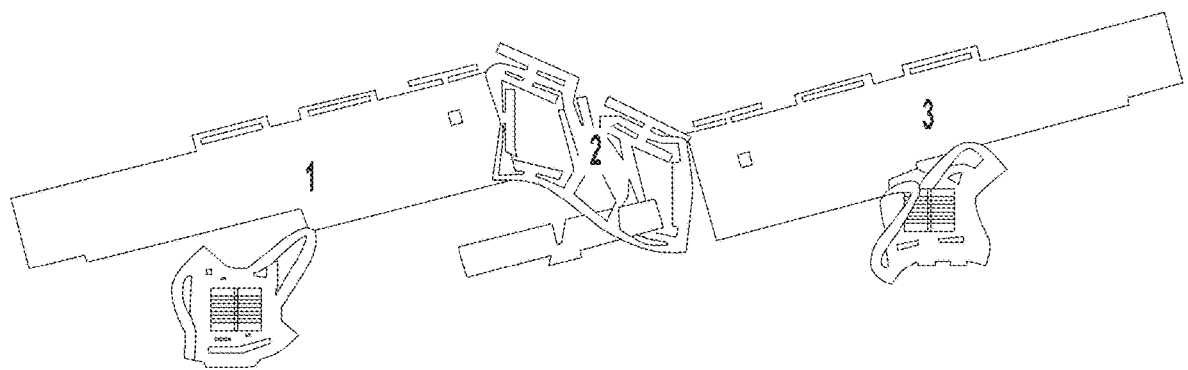
FIG. 5F illustrates the example four bar pivoting linkage of FIGS. 5A-5D in a title mode of operation, according to some non-limiting embodiments.

FIG. 5D is an enlarged view of the box springs of the four bar linkage 500 illustrated in FIG. 5C. In particular, FIG. 5D illustrates first and second dynamic pivots 510A, 510B at ends of first and second levers 116A, 116B FIG. 5E illustrates the example four bar pivoting linkage of FIGS. 5A-5D in a normal mode of operation, according to some non-limiting embodiments. FIG. 5F illustrates the example four bar pivoting linkage of FIGS. 5A-5D in a tilt mode of operation, according to some non-limiting embodiments. As shown in FIGS. 5E-5F, the double box spring elements of the pivoting linkage behave as a rigid bar in a tilt mode of operation, allowing the linkage to act as a three bar system.

Figure 6:
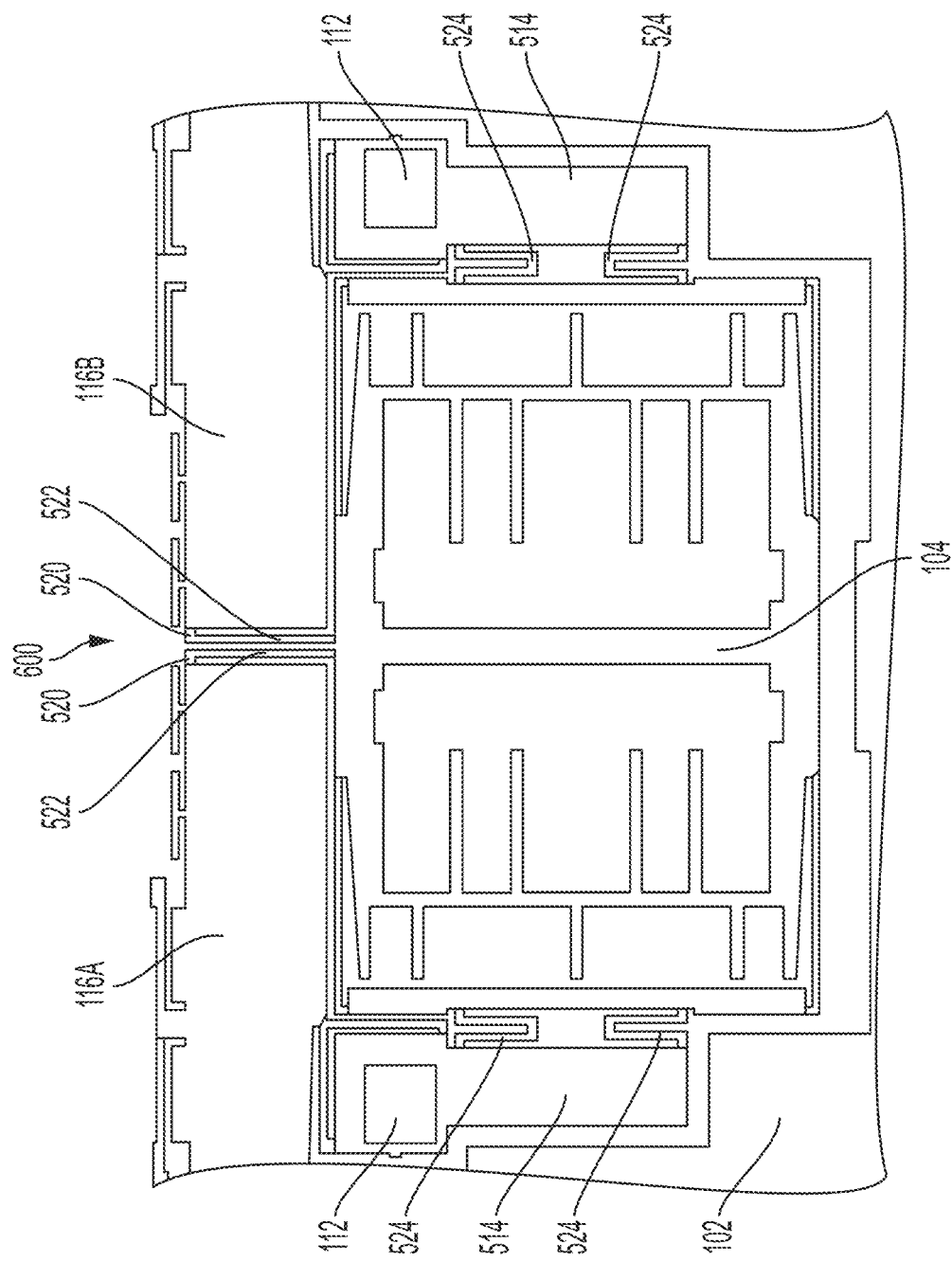
FIG. 6 illustrates a further example of a four bar pivoting linkage, according to some non-limiting embodiments.

FIG. 6 illustrates a further example of a four bar pivoting linkage 600, according to some non-limiting embodiments. The pivoting linkage 600 of FIG. 6 comprises four segments, with two segments per lever. In particular, the pivoting linkage 600 comprises a first lever 116A, second lever 116B, and springs 522. The respective springs may be coupled to the respective levers 116A, 116B via tethers 520.

In the illustrated embodiment of FIG. 6, the four bar linkage couples the levers 116A, 116B together through the drive structure 104. In particular, the respective levers 116A, 116B are each coupled to the drive structure 104, without being coupled directly together. The inventors have recognized that the four bar linkage design illustrated in FIG. 6 is advantageous for reducing sensitivity of the MEMS device to package stresses while reducing cubic stiffness.

The respective levers 116A, 116B may be coupled to one or more anchors 112. For example, in the illustrated embodiment, each lever 116A, 116B may be coupled to a respective anchor 112. In the illustrated embodiment, each lever 116A, 116B is coupled to a respective anchor 112 at multiple points.

Drive structure 104 may be coupled to one or more of anchors 112, in some embodiments. For example, as shown in FIG. 6, drive structure 104 is coupled to an arm 514 (e.g., via one or more folded springs 524). Arm 514 is then coupled to anchor 112. In the illustrated embodiment, the drive structure 104 is coupled to two anchors 112, however, the drive structure 104 may be coupled to any suitable number of anchors.

Figure 7:
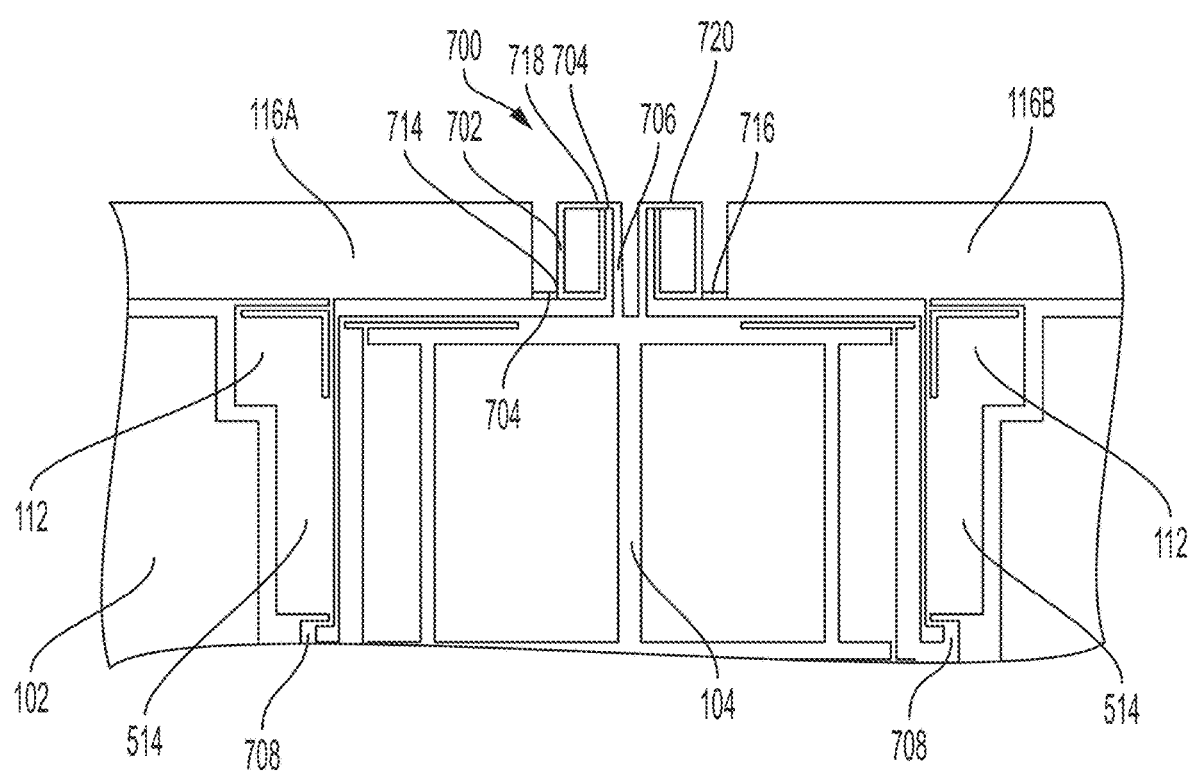
FIG. 7 illustrates an example of a five bar pivoting linkage, according to some non-limiting embodiments.

FIG. 7 illustrates an example of a five bar pivoting linkage 700, according to some non-limiting embodiments. The five bar linkage 700 shown in FIG. 7 combines aspects of the four bar pivoting linkages illustrated in FIGS. 5A-6. For example, the five bar pivoting linkage 700 comprises respective box springs 702 coupled to the respective levers 116A, 116B via tethers 704. In addition, the respective levers 116A, 116B are coupled together through the drive structure while not being coupled together directly, through a connector, for example. In particular, each box spring 702 is coupled to a spring 706 via a tether 704. Each spring 706 is coupled to the drive structure 104. The inventors have recognized that the five bar linkage design illustrated in FIG. 7 may be advantageous for reducing quadrature, shear and normal stress sensitivity, and non-linearities arising from increased cubic stiffness.

The five bar linkage 700 may also be viewed in terms of its pivots. For example, the first lever 116A may be considered a first bar, the second lever 116B may be considered a second bar, the box springs 702 may be considered third and fourth bars, and the springs 706 and tethers 704 together may be considered a fifth bar. The first bar 116A may be coupled to the proof mass at a first end of the five bar linkage 700 (e.g., via a spring and/or anchor 112). The first end may comprise a first fixed pivot (not shown), wherein the first bar 116A is configured to pivot about the first fixed pivot. The second bar 116B may be coupled to the proof mass at a second end of the four bar linkage 700 (e.g., via a spring and/or anchor 112). The second end may comprise a second fixed pivot (not shown), wherein the second bar 116B is configured to pivot about the second fixed pivot.

The respective box springs 702 may be coupled to respective ones of the first and second levers 116A, 116B at first and second dynamic pivots 714, 716. The respective box springs 702 may be coupled together via springs 706 and tethers 704. Each box spring 702 may be coupled to tethers 704 at and configured to pivot about third and fourth dynamic pivots 718, 720. Accordingly, each bar of the five bar linkage 700 may be configured to pivot relative to other bars of the five bar linkage 700.

As shown in FIG. 7, the drive structure may be coupled to one or more anchors 112. For example, as shown in FIG. 7, drive structure 104 is coupled to an arm 514 (e.g., via a single u-shaped spring 708). Arm 514 is then coupled to anchor 112. In the illustrated embodiment, the drive structure 104 is coupled to two anchors 112, however, the drive structure 104 may be coupled to any suitable number of anchors.

As described herein, MEMS gyroscopes are susceptible to a number of error sources, including quadrature, sensitivity to shear and normal stress, and nonlinearities arising from cubic stiffness. As further described herein, the different types and designs of pivoting linkages may reduce or eliminate entirely one or more of these error sources.

TABLE 1

Error Sources for Kinematic Pivoting Linkage Type and Design

| Objective (Error Source Target) | Three Bar Linkage (FIGS. 4A-4F) | Four Bar Linkage (FIGS. 5A-5F) | Four Bar Linkage (FIG. 6) |
|---|---|---|---|
| Quadrature (tilt) | ✓ | x | ✓ |
| Quadrature (sidewall) | ✓ | ✓ | ✓ |
| Nonlinearity (cubic stiffness) | ✓ | ✓ | ✓ |
| Normal stress sensitivity | x | ✓ | ✓ |
| Shear stress sensitivity | x | ✓ | x |

As illustrated by Table 1, the pivoting linkages described herein have advantages and tradeoffs. In particular, each of the pivoting linkage designs described herein having at least three bars reduce nonlinearity arising from increased cubic stiffness, in contrast to pivoting linkages having less than three bars. In some circumstances, it may be more desirable to select one design over another depending on the type of error source desired to be eliminated or reduced. For example, increased quadrature may be an acceptable tradeoff in some circumstances because quadrature may be accounted for electrically through the use of quadrature trimming electrodes, while it may not otherwise be possible to account for other sources of error in this manner.

Figure 8:
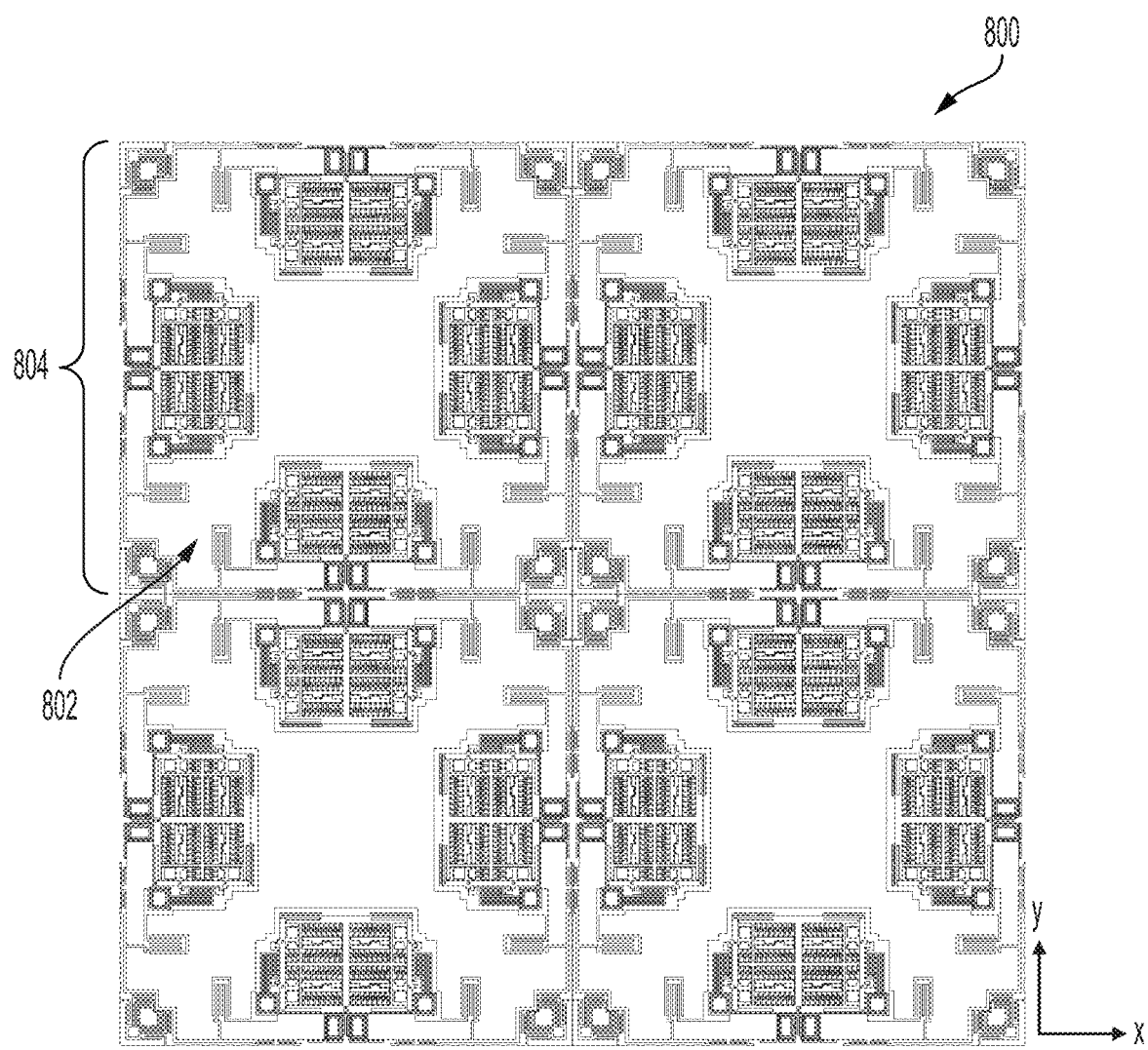
FIG. 8 illustrates an example MEMS gyroscope having four proof masses, according to some non-limiting embodiments.

As described herein, the kinematic linkages and related aspects may be implemented in a MEMS gyroscope (e.g., a MEMS gyroscope configured to sense roll, pitch and/or yaw rotation). In some embodiments, the example MEMS device 100 may form a portion of a larger MEMS device. FIG. 8 illustrates an example MEMS gyroscope 800 having four proof masses 802, according to some non-limiting embodiments. In some embodiments, the MEMS gyroscope 800 of FIG. 8 may be configured to sense rotation about two or more axes. FIG. 8 illustrates an example of a MEMS gyroscope 800 having four quadrants 804 coupled together and arranged in a 2×2 formation. Each quadrant 804 of the MEMS gyroscope of FIG. 8 may have a proof mass 802 and one or more pivoting linkages described herein.

The proof masses 802 in the respective quadrants may be configured to move anti-phase relative to an adjacent proof mass 802. That is, a proof mass 802 may be configured to move in an opposite direction along a first axis in a drive mode relative to the motion of proof masses vertically and horizontally adjacent to the proof mass 802, and in a same direction along the first axis relative to motion of a proof mass diagonally adjacent to the proof mass 802. In a sense mode, the proof mass 802 may be configured to move in an opposite direction along a second axis substantially perpendicular to the first axis relative to motion of the proof masses vertically and horizontally adjacent to the proof mass 802, and in a same direction along the second axis relative to the motion of a proof mass diagonally adjacent to the proof mass 802.

Figure 9:
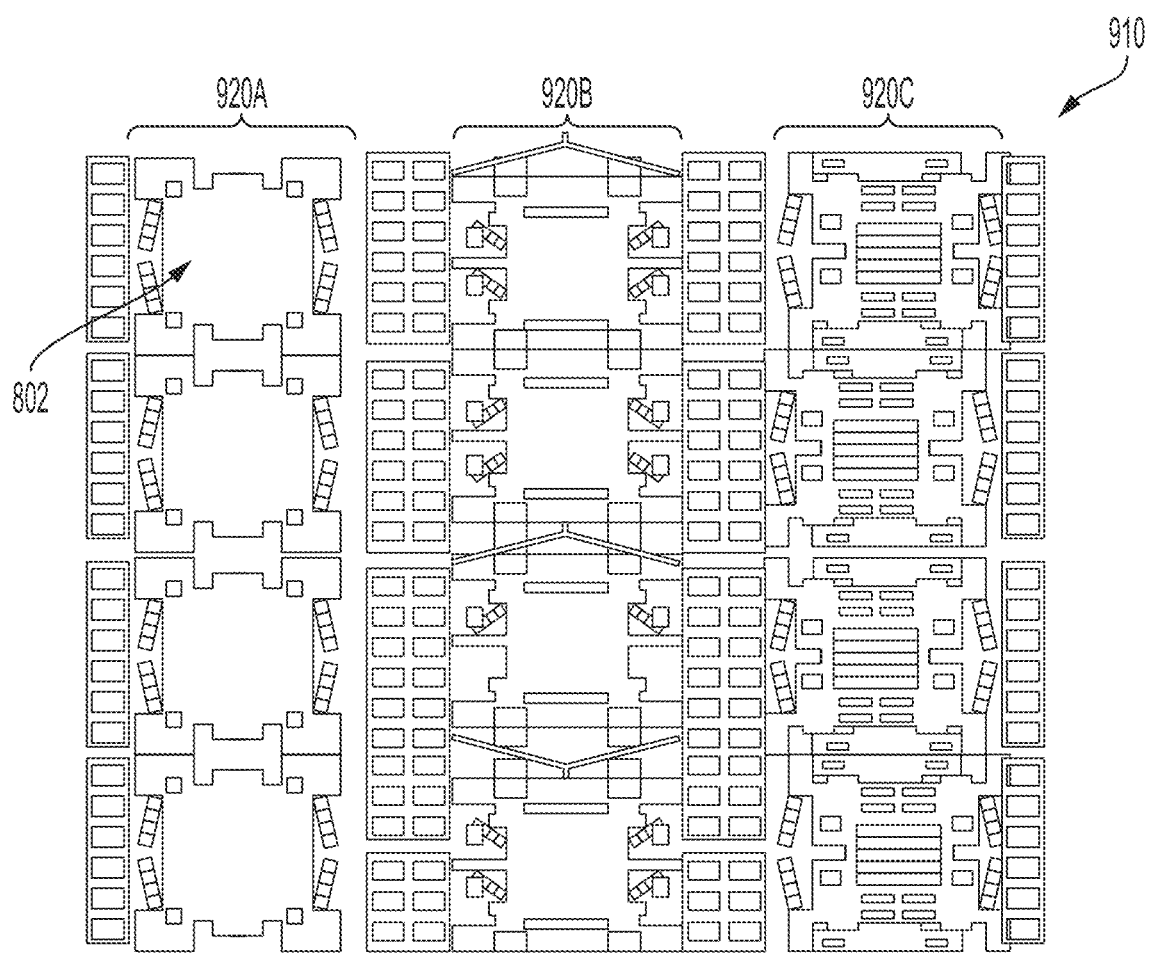
FIG. 9 illustrates an example MEMS gyroscope having twelve proof masses, according to some non-limiting embodiments.

FIG. 9 illustrates an example MEMS gyroscope 910 having twelve proof masses 802, according to some non-limiting embodiments. In particular, FIG. 9 illustrates an example of a MEMS gyroscope 910 having three columns 920A, 920B, 920C, each column being configured to sense rotation about a respective axis (e.g., pitch, roll, or yaw rotation). In some embodiments, the MEMS gyroscope 910 may be configured having two columns, with one or more columns being configured to sense rotation about multiple axes (e.g., one or more of pitch, roll, and/or yaw rotation). Each column may comprise at least three proof masses 802, with the MEMS gyroscope 910 of the illustrated embodiment having four proof masses per column. The MEMS gyroscope 910 of FIG. 9 may be implemented having the pivoting linkages and related mechanisms described. For example, in some embodiments, the MEMS gyroscope 910 of FIG. 9 may implement one or more of the pivoting linkages described herein in one or more of the columns of the MEMS gyroscope 910 (e.g., in a column of the MEMS gyroscope configured to sense yaw rotation).

MEMS devices having pivoting linkages of the types described herein may be deployed in various settings to detect angular rates, including sports, healthcare, military, and industrial applications, among others. A MEMS device (e.g., a MEMS inertial sensor such as a MEMS gyroscope, for example) may be mounted as a wearable sensor deployed in monitoring sports-related physical activity and performance, patient health, military personnel activity, or other applications of interest of a user. A MEMS gyroscope may be disposed in a smartphone, and may be configured to sense roll, pitch and/or yaw angular rates.

Figure 10:
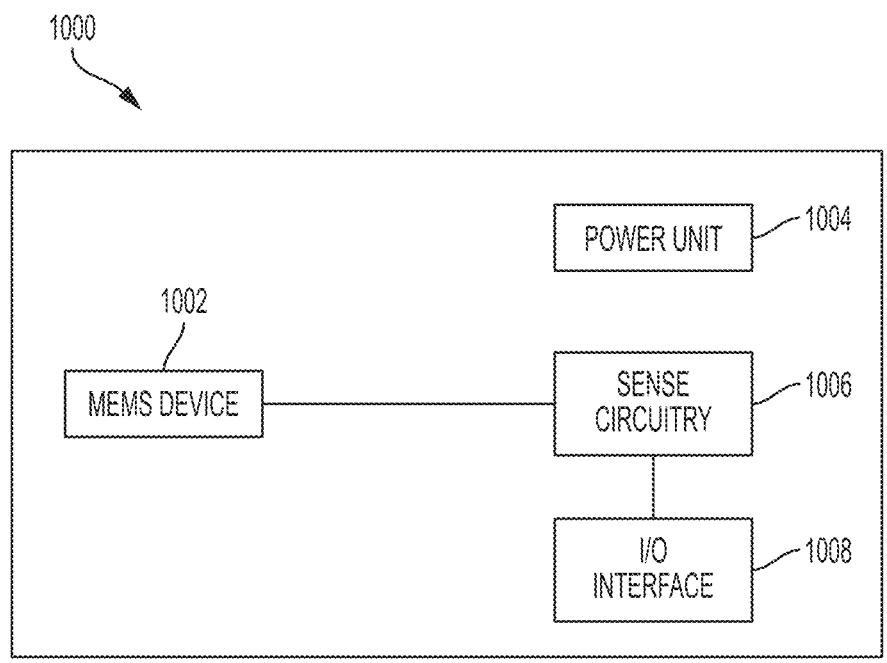
FIG. 10 is a block diagram illustrating an example system including a MEMS gyroscope, according to some non-limiting embodiments.

FIG. 10 is a block diagram illustrating a system 1000 comprising a MEMS device 1002, a power unit 1004, sense circuitry 1006 and input/output (I/O) interface 1008. MEMS device 1002 may comprise any one or a combination of the MEMS devices described herein. In some embodiments, the MEMS device(s) may comprise a MEMS gyroscope configured to sense roll, pitch and/or yaw angular rates.

System 1000 may periodically transmit, via wired connections or wirelessly, data representing sensed angular rates to an external monitoring system, such as a computer, a smartphone, a tablet, a smartwatch, smartglasses, or any other suitable receiving device. I/O interface 1008 may be configured to transmit and/or receive data via Wi-Fi, Bluetooth, Bluetooth Low Energy (BLE), Zigbee, Thread, ANT, ANT+, IEEE 802.15.4, IEEE 802.11.ah, or any other suitable wireless communication protocol. Alternatively, or additionally, I/O interface 1008 may be configured to transmit and/or receive data using proprietary connectivity protocols. I/O interface 1008 may comprise one or more antennas, such as a microstrip antenna. In some embodiments, I/O interface 1008 may be connected to a cable, and may be configured to transmit and/or receive signals through the cable.

System 1000 may be powered using power unit 1004. Power unit 1004 may be configured to power some or all of sense circuitry 1006, I/O interface 1008, and/or MEMS device 1002. In some embodiments, power unit 1004 may comprise one or more batteries. System 1000 may, in at least some embodiments, consume sufficiently little power to allow for its operation for extended periods based solely on battery power. The battery or batteries may be rechargeable in some embodiments. Power unit 1004 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery. In some embodiments, power unit 1004 may comprise circuitry to convert AC power to DC power. For example, power unit 1004 may receive AC power from a power source external to system 1000, such as via I/O interface 1008, and may provide DC power to some or all the components of system 1000. In such instances, power unit 1004 may comprise a rectifier, a voltage regulator, a DC-DC converter, or any other suitable apparatus for power conversion.

Power unit 1004 may comprise energy harvesting components and/or energy storage components, in some embodiments. Energy may be harvested from the surrounding environment and stored for powering the system 1000 when needed, which may include periodic, random, or continuous powering. The type of energy harvesting components implemented may be selected based on the anticipated environment of the system 1000, for example based on the expected magnitude and frequency of motion the system 1000 is likely to experience, the amount of stress the system is likely to experience, the amount of light exposure the system is likely to experience, and/or the temperature(s) to which the system is likely to be exposed, among other possible considerations. Examples of suitable energy harvesting technologies include thermoelectric energy harvesting, magnetic vibrational harvesting, electrical overstress harvesting, photovoltaic harvesting, radio frequency harvesting, and kinetic energy harvesting. The energy storage components may comprise supercapacitors in some embodiments.

Figure 11:
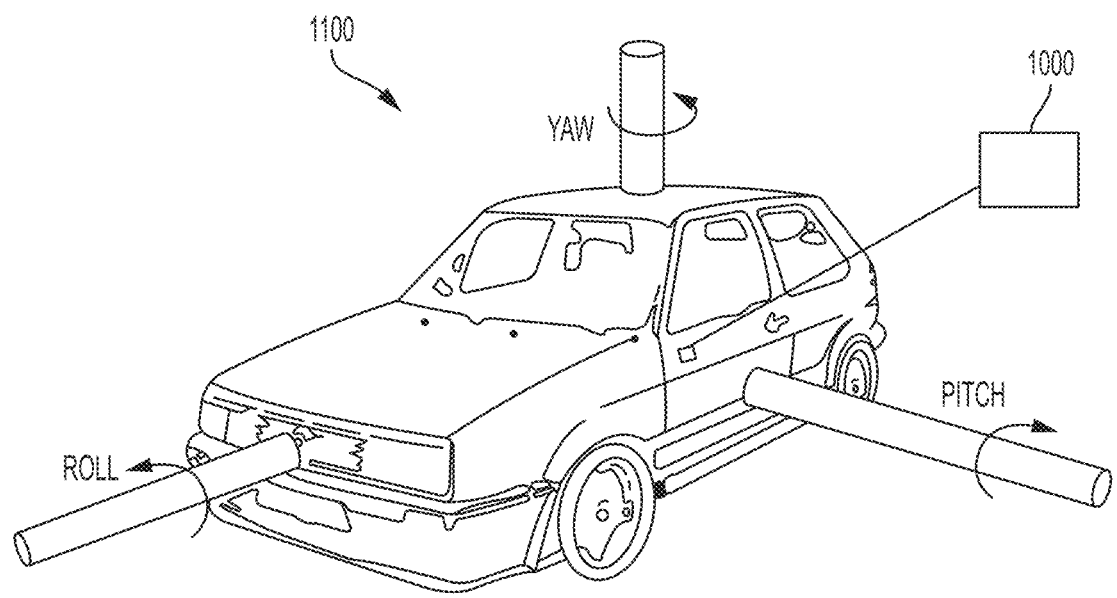
FIG. 11 is a perspective view illustrating an automobile including an example system having a MEMS gyroscope, according to some non-limiting embodiments.

As described above, MEMS devices of the types described herein may be deployed in various settings, for example, to detect angular rates. One such setting is in automobiles, or other vehicles, such as boats or aircrafts. FIG. 11 illustrates schematically an automobile 1100 comprising a system 1000, according to some non-limiting embodiments. System 1000 may be disposed in any suitable location of automobile 1100. In some embodiments, the system 1000 may comprise a package or housing attached to a suitable part of the automobile 1100, with the MEMS device inside. In some embodiments, system 1000 may be configured to sense roll, pitch and/or yaw angular rates. System 1000 may be configured to provide, using I/O interface 1008, sensed angular rates to a computer system disposed in automobile 1100 and/or to a computer system disposed on a base station outside automobile 1100.

Another setting in which MEMS devices having pivoting linkages of the types described herein may be used is in sensor devices for sports applications, such as tennis, swimming, running, baseball, or hockey, among other possibilities. In some embodiments, a MEMS device of the types described herein may be a wearable fitness device. In other embodiments, the sensor may be part of a piece of sporting equipment, such as being part of a tennis racket, baseball bat, or hockey stick. Sense data from the sensor may be used to assess performance of the user.

Aspects of the technology described herein may provide one or more benefits, some of which have been previously described. Aspects of the technology described herein provide for pivoting linkages having at least three bars and other aspects for reducing quadrature, sensitivities to shear and normal stress, and cubic stiffness of a MEMS device, such as a MEMS gyroscope. It should be appreciated that not all aspects and embodiments necessarily provide all of the benefits described herein. Further, it should be appreciated that aspects of the technology described herein may provide additional benefits to those described herein.

The expressions "substantially in a direction" and "substantially parallel to a direction" should be interpreted herein as parallel to the direction or angled with respect to the direction by less than 20% including any value within that range.

The terms "approximately" and "about" may be used to mean±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A microelectromechanical systems (MEMS) device, comprising:
a substrate;
a proof mass coupled to the substrate and configured to move along a resonator axis;
a drive structure comprising at least one electrode and being configured to drive the proof mass to move along the resonator axis; and
a pivoting linkage coupled to the proof mass at first and second ends of the pivoting linkage, the first end comprising a first fixed pivot and the second end comprising a second fixed pivot, the pivoting linkage comprising:
a first bar configured to pivot about the first fixed pivot and a first dynamic pivot;
a second bar configured to pivot about the second fixed pivot and a second dynamic pivot; and
a third bar configured to pivot about the first dynamic pivot and the second dynamic pivot, wherein:
the third bar comprises a first portion configured to pivot about the first dynamic pivot and a third dynamic pivot; and
the third bar comprises a second portion configured to pivot about the second dynamic pivot and the third dynamic pivot; and
wherein the proof mass is configured to move along the resonator axis when the pivoting linkage pivots.

2. The MEMS device of claim 1, wherein the pivoting linkage is coupled to the drive structure and is configured to transfer motion between the drive structure and the proof mass.

3. The MEMS device of claim 1, wherein the third bar is prevented from rotating relative to the proof mass when the first and second bars rotate in opposite directions.

4. The MEMS device of claim 3, wherein the third bar is configured to rotate relative to the proof mass when the first and second bars rotate in a same direction.

5. The MEMS device of claim 3, wherein the third bar is coupled to the drive structure by at least one spring.

6. The MEMS device of claim 3, wherein the third bar is coupled to each of the first and second bars by one or more tethers.

7. The MEMS device of claim 1, further comprising:
at least one sense structure comprising at least one electrode and being configured to move along a second axis substantially perpendicular to the resonator axis;
a second pivoting linkage coupled to the proof mass at first and second ends of the second pivoting linkage, the first end of the second pivoting linkage comprising a third fixed pivot and the second end of the second pivoting linkage comprising a fourth fixed pivot, the pivoting linkage comprising:
a first bar configured to pivot about the third fixed pivot and a third dynamic pivot;
a second bar configured to pivot about the fourth fixed pivot and a fourth dynamic pivot; and
a third bar configured to pivot about the third dynamic pivot and the fourth dynamic pivot,
wherein the at least one sense structure is configured to move along the second axis when the pivoting linkage pivots.

8. The MEMS device of claim 1, wherein the second portion of the third bar further comprises:
a portion configured to pivot about the second dynamic pivot and a fourth dynamic pivot; and a portion configured to pivot about the third dynamic pivot and the fourth dynamic pivot.

9. A microelectromechanical systems (MEMS) device, comprising:
a substrate;
a proof mass coupled to the substrate and configured to move along a first axis in response to rotation of the MEMS device;
a sense structure comprising at least one electrode and being configured to move along the first axis; and
a pivoting linkage coupling the sense structure to the proof mass at first and second ends of the pivoting linkage, the first end comprising a first fixed pivot and the second end comprising a second fixed pivot, the pivoting linkage comprising:
a first bar configured to pivot about the first fixed pivot point and a first dynamic pivot;
a second bar configured to pivot about the second fixed pivot and a second dynamic pivot; and
a third bar configured to pivot about the first dynamic pivot and the second dynamic pivot, wherein:
the third bar comprises a first portion configured to pivot about the first dynamic pivot and a third dynamic pivot; and
the third bar comprises a second portion configured to pivot about the second dynamic pivot and the third dynamic pivot; and
wherein the pivoting linkage is configured to pivot when the proof mass moves along the first axis.

10. The MEMS device of claim 9, wherein the pivoting linkage is coupled to the sense structure and configured to transfer motion between the proof mass and the sense structure.

11. The MEMS device of claim 9, wherein the third bar comprises a spring.

12. The MEMS device of claim 11, wherein the third bar is configured to rotate relative to the proof mass when the first and second bars rotate in a first direction.

13. The MEMS device of claim 12, wherein the third bar is configured to rotate in a second direction opposite to the first direction when the first and second bars rotate in the first direction.

14. A microelectromechanical systems (MEMS) device, comprising:
a proof mass configured to move along a first axis;
a drive structure comprising at least one electrode and being configured to drive the proof mass along the first axis; and
a linkage coupling the proof mass to the at least one drive structure, wherein the linkage comprises:
a first lever coupled to the proof mass at a first end of the first lever;
a first spring coupled to the first lever at a second end of the first lever;
a second lever coupled to the proof mass at a first end of the second lever;
a second spring coupled to the second lever at a second end of the second lever;
wherein the first and second springs are coupled together; and
wherein the linkage is configured to pivot about first and second dynamic pivots of the first spring and first and second dynamic pivots of the second spring.

15. The MEMS device of claim 14, wherein the first and second springs comprise box springs.

16. The MEMS device of claim 14, wherein the first and second dynamic pivots of the first spring are disposed on opposing diagonals of the first spring.

17. The MEMS device of claim 14, wherein the second dynamic pivots of the first and second springs comprise a shared pivot shared between the first and second springs.

18. The MEMS device of claim 14, further comprising a first fixed pivot at the first end of the first lever and a second fixed pivot at the second end of the second lever.

19. The MEMS device of claim 14, further comprising a substrate coupled to the proof mass, wherein the at least one electrode of the drive structure and at least one electrode of the substrate together forms at least one drive capacitor.

20. The MEMS device of claim 9, wherein the second portion of the third bar further comprises:
a portion configured to pivot about the second dynamic pivot and a fourth dynamic pivot; and
a portion configured to pivot about the third dynamic pivot and the fourth dynamic pivot.

* * * * *